(12) United States Patent
Kibler

(10) Patent No.: US 10,173,572 B2
(45) Date of Patent: Jan. 8, 2019

(54) ROLL OFF TRAILER FRAME AND TWO TROLLEY ASSEMBLIES

(71) Applicant: MAC TRAILER MANUFACTURING, INC., Alliance, OH (US)

(72) Inventor: Scott A. Kibler, Kensington, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 138 days.

(21) Appl. No.: 14/844,315

(22) Filed: Sep. 3, 2015

(65) Prior Publication Data
US 2016/0068090 A1 Mar. 10, 2016

Related U.S. Application Data

(60) Provisional application No. 62/045,785, filed on Sep. 4, 2014.

(51) Int. Cl.
| *B60P 1/30* | (2006.01) |
| *B60P 1/16* | (2006.01) |
| *B60P 1/22* | (2006.01) |
| *B60P 1/20* | (2006.01) |
| *B60P 1/64* | (2006.01) |

(52) U.S. Cl.
CPC ............ *B60P 1/30* (2013.01); *B60P 1/162* (2013.01); *B60P 1/20* (2013.01); *B60P 1/22* (2013.01); *B60P 1/6454* (2013.01)

(58) Field of Classification Search
CPC .. B60P 1/22; B60P 1/30; B60P 1/6427; B60P 1/6454

USPC ................................................. 414/494, 500
See application file for complete search history.

(56) References Cited

U.S. PATENT DOCUMENTS

| 2,722,433 A | 11/1955 | Shinn |
| 2,789,714 A | 4/1957 | Norris |
| 3,049,378 A * | 8/1962 | Nelson ...................... B60P 1/16 |
| | | 414/500 |
| 3,587,890 A | 6/1971 | Hyland |
| 4,455,118 A * | 6/1984 | Scharf ..................... B60P 1/6454 |
| | | 414/494 |
| 4,511,303 A | 4/1985 | O'Neill |
| 4,529,349 A * | 7/1985 | Lutz ....................... B60P 1/6454 |
| | | 414/494 |
| 4,645,405 A * | 2/1987 | Cambiano ............. B60P 1/6454 |
| | | 414/494 |
| 4,938,524 A | 7/1990 | Straub et al. |
| 4,954,039 A * | 9/1990 | Johnston ............... B60P 1/6454 |
| | | 414/494 |
| 4,988,258 A | 1/1991 | Lutz et al. |

(Continued)

*Primary Examiner* — James Keenan
(74) *Attorney, Agent, or Firm* — Sand & Sebolt

(57) ABSTRACT

A roll off trailer includes first and second trolley assemblies and a hoisting cable connected at one end to the first trolley assemble and extending about a sheave in each of the first and second trolley assemblies. The cable connects to a container. The second trolley is displaced in a first direction while simultaneously drawing the container via the cable from the first grounded container position to a second container position generally midway atop the trailer. Then, the first trolley is displaced in a second direction while simultaneously drawing the container via the cable from the second container position to a third container position generally adjacent the front of the trailer.

19 Claims, 28 Drawing Sheets

(56) References Cited

U.S. PATENT DOCUMENTS

| | | | |
|---|---|---|---|
| 5,088,875 A | 2/1992 | Galbreath et al. | |
| 5,215,426 A | 6/1993 | Bills, Jr. | |
| 5,322,314 A * | 6/1994 | Blum | B62D 21/20 |
| | | | 280/400 |
| 5,967,735 A | 10/1999 | Smart et al. | |
| 7,112,030 B2 * | 9/2006 | Renziehausen | B60P 1/6454 |
| | | | 414/494 |
| 7,192,239 B2 * | 3/2007 | Marmur | B60P 1/6427 |
| | | | 414/475 |
| 7,695,237 B2 * | 4/2010 | Shirvanian | B60P 1/6454 |
| | | | 414/494 |
| 8,371,599 B2 | 2/2013 | Duvall et al. | |
| 8,444,365 B2 * | 5/2013 | Duell | B60P 1/6454 |
| | | | 414/494 |
| 8,662,525 B1 | 3/2014 | Dierks et al. | |
| 9,004,842 B2 * | 4/2015 | Downing | B60P 1/6454 |
| | | | 414/494 |
| 2001/0030431 A1 | 10/2001 | Killday | |
| 2006/0062660 A1 * | 3/2006 | Marmur | B60P 1/6454 |
| | | | 414/498 |
| 2008/0036176 A1 | 2/2008 | Schuettenberg | |
| 2008/0157504 A1 | 7/2008 | Schuettenberg | |

* cited by examiner

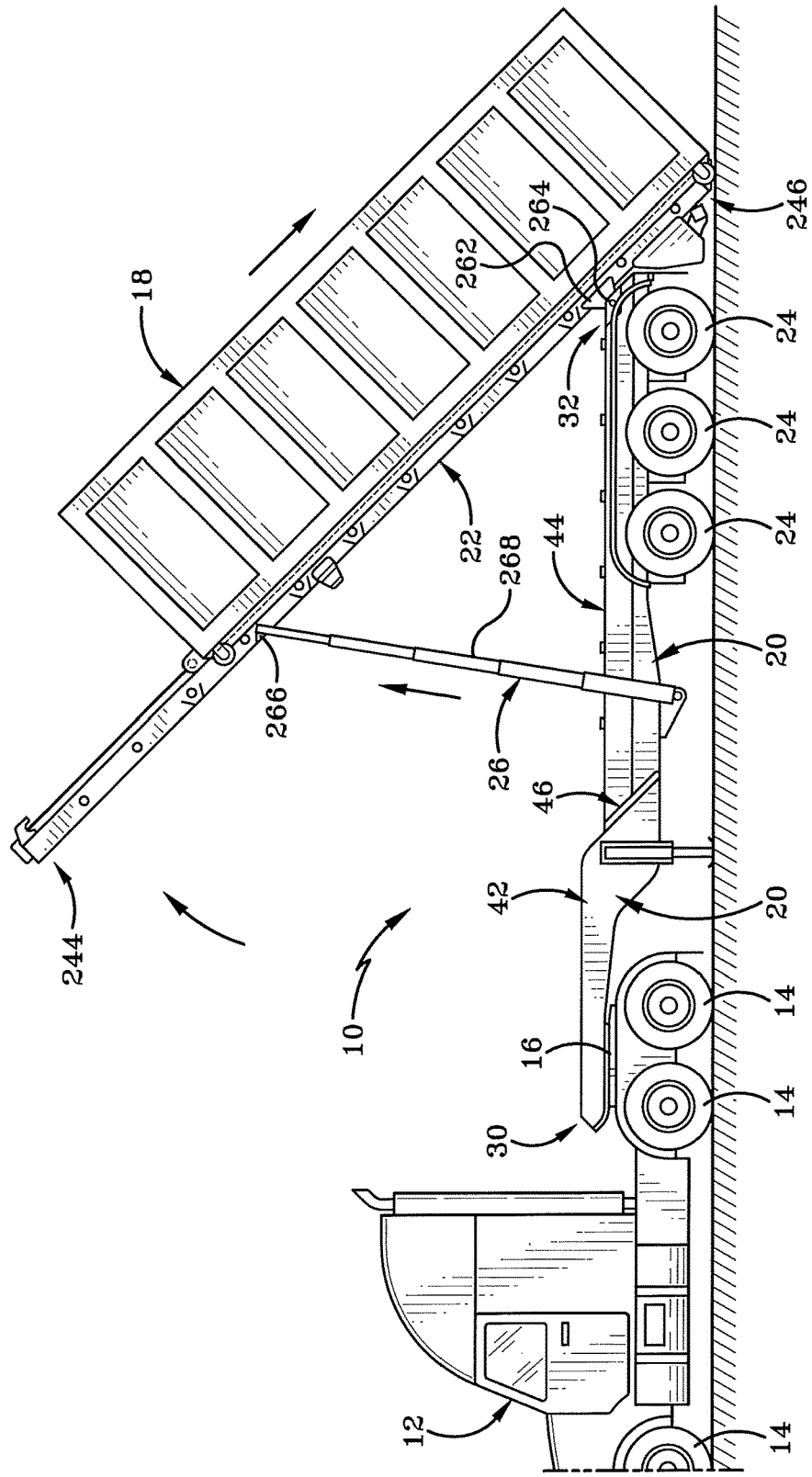

| FIG-10A | FIG-10B | FIG-10C |

| FIG-11A | FIG-11B | FIG-11C |

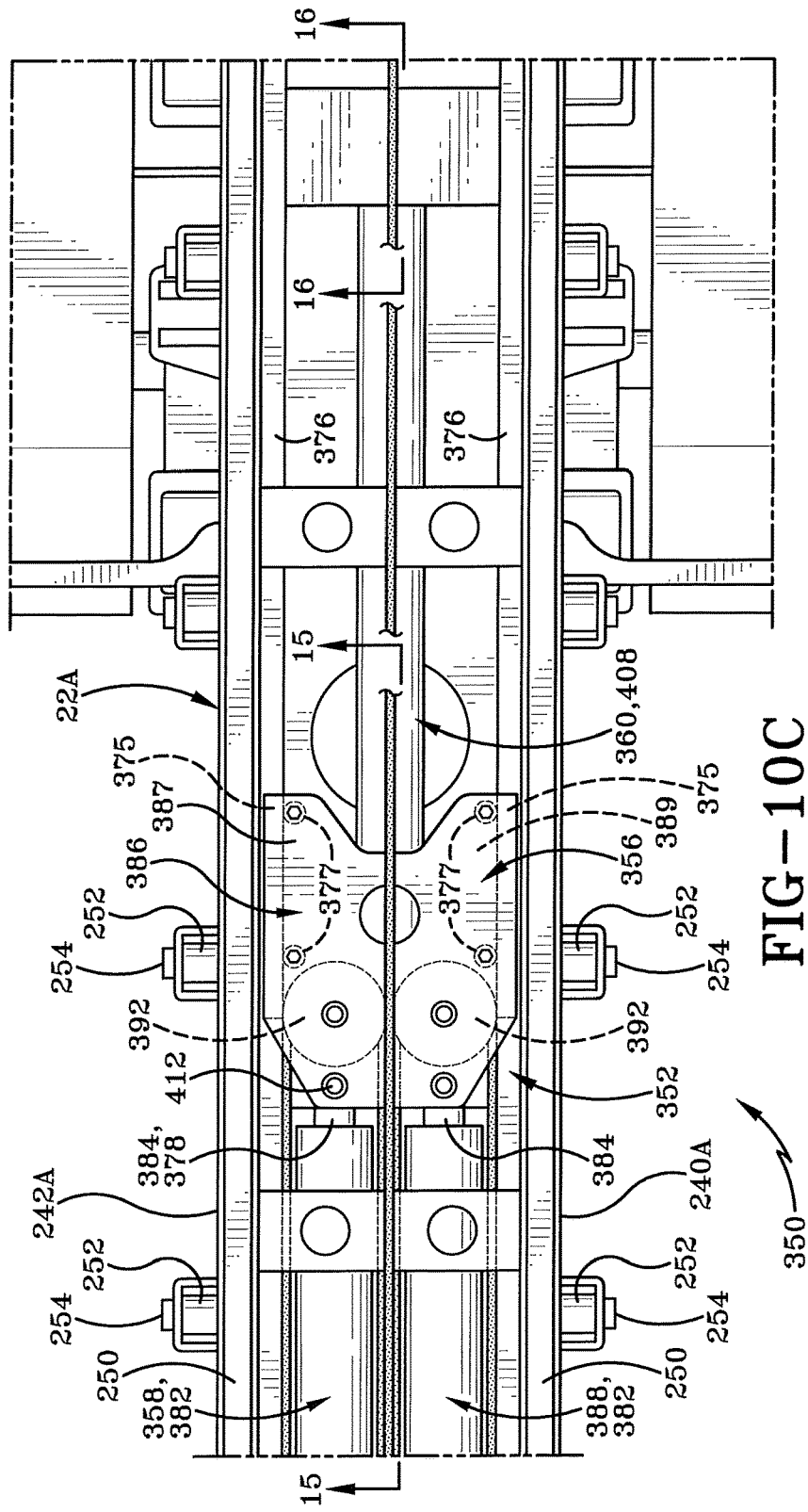

ROLL OFF TRAILER FRAME AND TWO TROLLEY ASSEMBLIES

CROSS REFERENCE TO RELATED APPLICATIONS

This application claims priority from U.S. Provisional Application Ser. No. 62/045,785, filed on Sep. 4, 2014; the disclosure of which is entirely incorporated herein by reference.

BACKGROUND OF THE DISCLOSURE

Technical Field

The technical field relates generally to roll off trailers and their container lifting systems. Specifically, the present disclosure relates to a roll off trailer frame and two trolley assemblies for lifting a container onto the trailer.

Background Information

Roll off trailers are known in the art and include a frame having a forward end having a hitch attachment for attaching to a tractor vehicle and a rear end including ground engaging wheels and a suspension assembly for engaging a road surface. The roll off trailers include a tabletop capable of pivoting upwards to draw a container stored or disposed in a grounded position onto the table frame and hauled away when the trailer is connected to the tractor vehicle.

Conventionally known roll off trailers are constructed from heavy steel. The steel construction is ordinarily assumed necessary to support the weight of the containers hauled on a tabletop. Further, conventional hydraulic systems operate in an inefficient manner ordinarily setting a container near the middle of the frame during transport.

SUMMARY

Issues continue to exist with these steel roll off trailers, namely, their excessive weight due to the heavy steel construction. Further, their lifting assemblies center a container along the table top. Thus, a need continues to exist for a roll off trailer device having a weight lighter than those conventionally known roll off trailers. And, a need exists for an improved way to better store the container atop the table top. The present disclosure addresses these and other issues.

In one aspect, an embodiment of the disclosure may provide a roll off trailer comprising: a pair of longitudinally extending rails pivotably coupled with a trailer frame, the rails adapted to support a container thereon; a first trolley assembly configured to move between the rails; a second trolley assembly configured to move between the rails; and a cable extending around the first and second trolley assemblies adapted to move the container along the rails as the first and second trolley assemblies move relative to the rails.

In another aspect, an embodiment of the disclosure may provide a container hauling roll off trailer comprising: a trailer frame including a forward end and a rear end; a container carrying platform including a pair of spaced apart parallel rails positioned above the trailer frame; a first moveable slide plate positioned between the rails; and a second moveable slide plate operatively connected to the first slide plate assembly, the second slide plate moveable in a direction opposite than that of the first slide plate.

In yet another aspect, an embodiment of the disclosure may provide a method of use for a roll of trailer comprising the steps of: providing a roll off trailer including a first and second trolley assemblies and a hoisting cable connected at one end to the first trolley assembly and extending about a first sheave in the first trolley assembly and a second sheave in the second trolley assembly; connecting a free end of the cable to a container in a first grounded container position on the ground; displacing the second trolley assembly in a first direction and simultaneously drawing the container via the cable from the first grounded container position to a second container position generally between front and rear ends atop the trailer; and displacing the first trolley assembly in a different second direction and simultaneously drawing the container via the cable from the second container position to a third container position generally adjacent the front of the trailer.

BRIEF DESCRIPTION OF THE SEVERAL VIEWS OF THE DRAWINGS

A sample embodiment of the disclosure, illustrative of the best mode in which Applicant contemplates applying the principles, is set forth in the following description, is shown in the drawings and is particularly and distinctly pointed out and set forth in the appended claims. The accompanying drawings, which are incorporated in and constitute a part of the specification, illustrate various example methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 1A is an operational side elevation view of the first embodiment of the present disclosure;

FIG. 10C is an enlarged top plan view of a rear section of the second embodiment;

Similar numbers refer to similar parts throughout the drawings.

DETAILED DESCRIPTION

Figure 1:
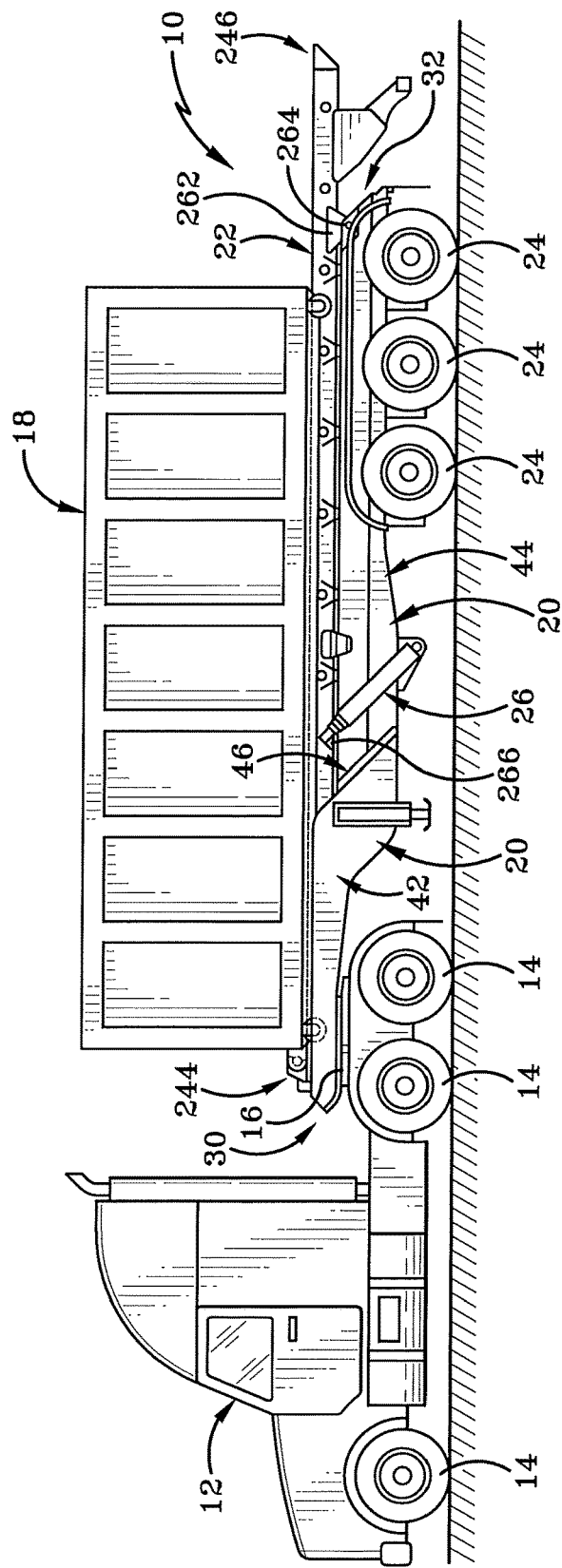
FIG. 1 is an environmental side elevation view of a first embodiment of the present disclosure depicting an aluminum roll off trailer having a stepped out neck.
Figure 4:
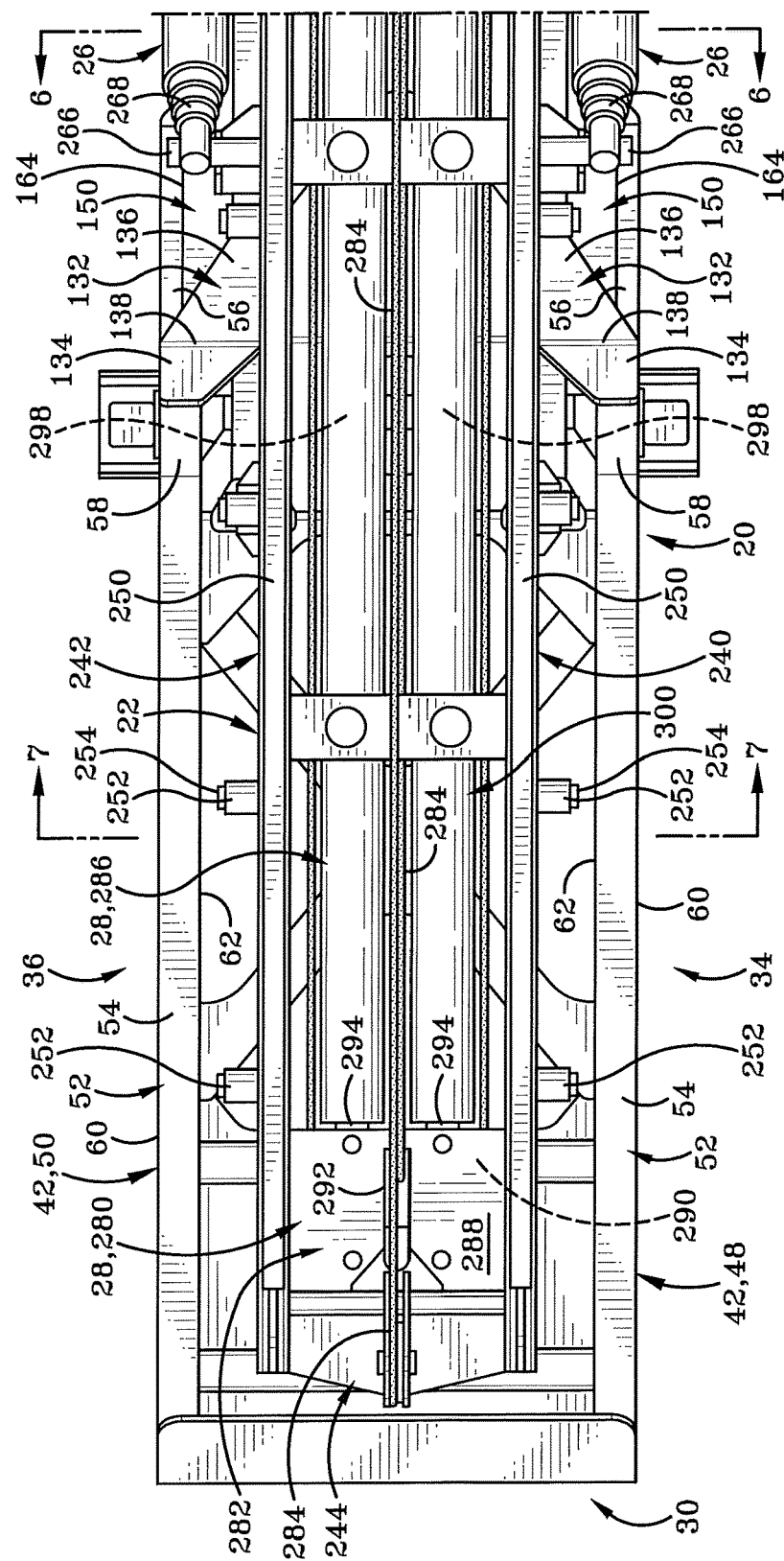
FIG. 4 is an enlarged top plan view of the front section of the first embodiment.

As depicted in FIG. 1 and FIG. 1A, a roll off trailer 10 is configured to be towed in a releasably connected position behind truck 12 having ground engaging wheels 14 by a fifth wheel assembly 16 located adjacent the rear of truck 12. Trailer 10 is configured to carry a container or box 18 thereon. As will be depicted throughout the later figures, roll off trailer 10 has a front section 42 and a rear section 44 connected by a stepped out neck 46 which allows box 18 to be positioned more forwardly atop trailer 10 for an improved weight distribution. Trailer 10 includes a trailer frame 20, a container engaging platform or tabletop 22, a suspension and wheel assembly 24, a pair of hydraulic lift arms 26, and a container moving hydraulic system 28 (FIG. 4).

Figure 2:
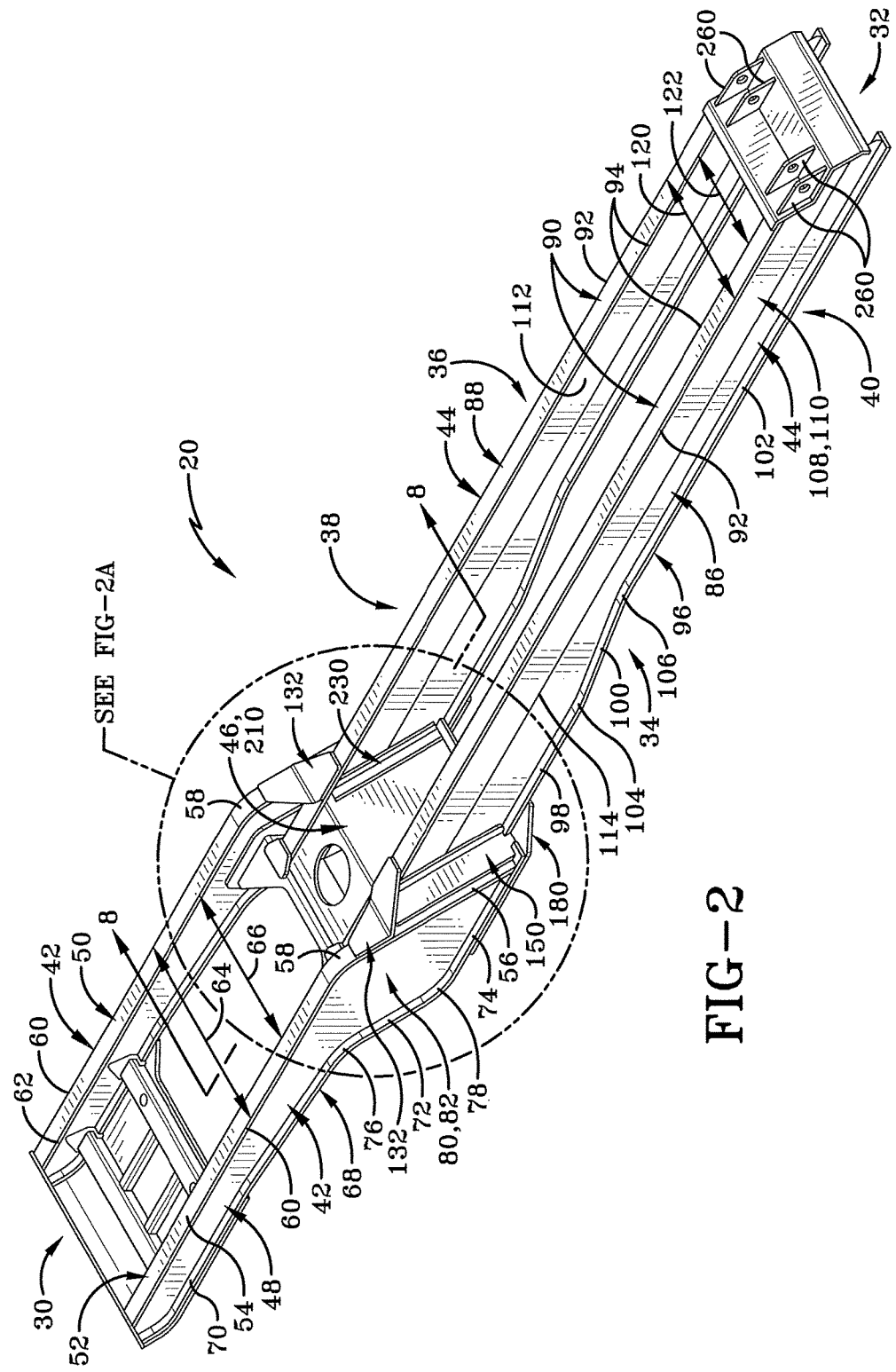
FIG. 2 is a perspective view of a trailer frame.
Figure 2A:
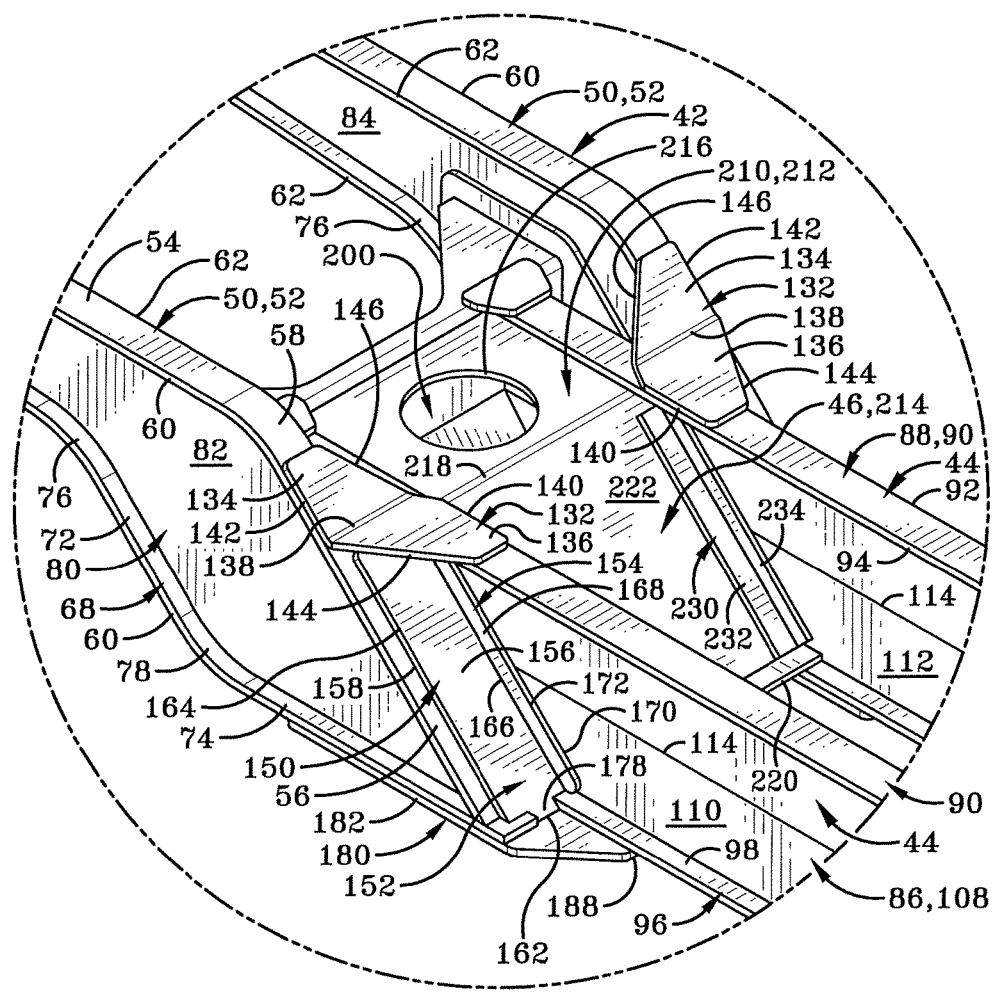
FIG. 2A is an enlarged perspective view of the stepped out neck section on the frame within the callout box labeled SEE FIG. 2A in FIG. 2.
Figure 3:
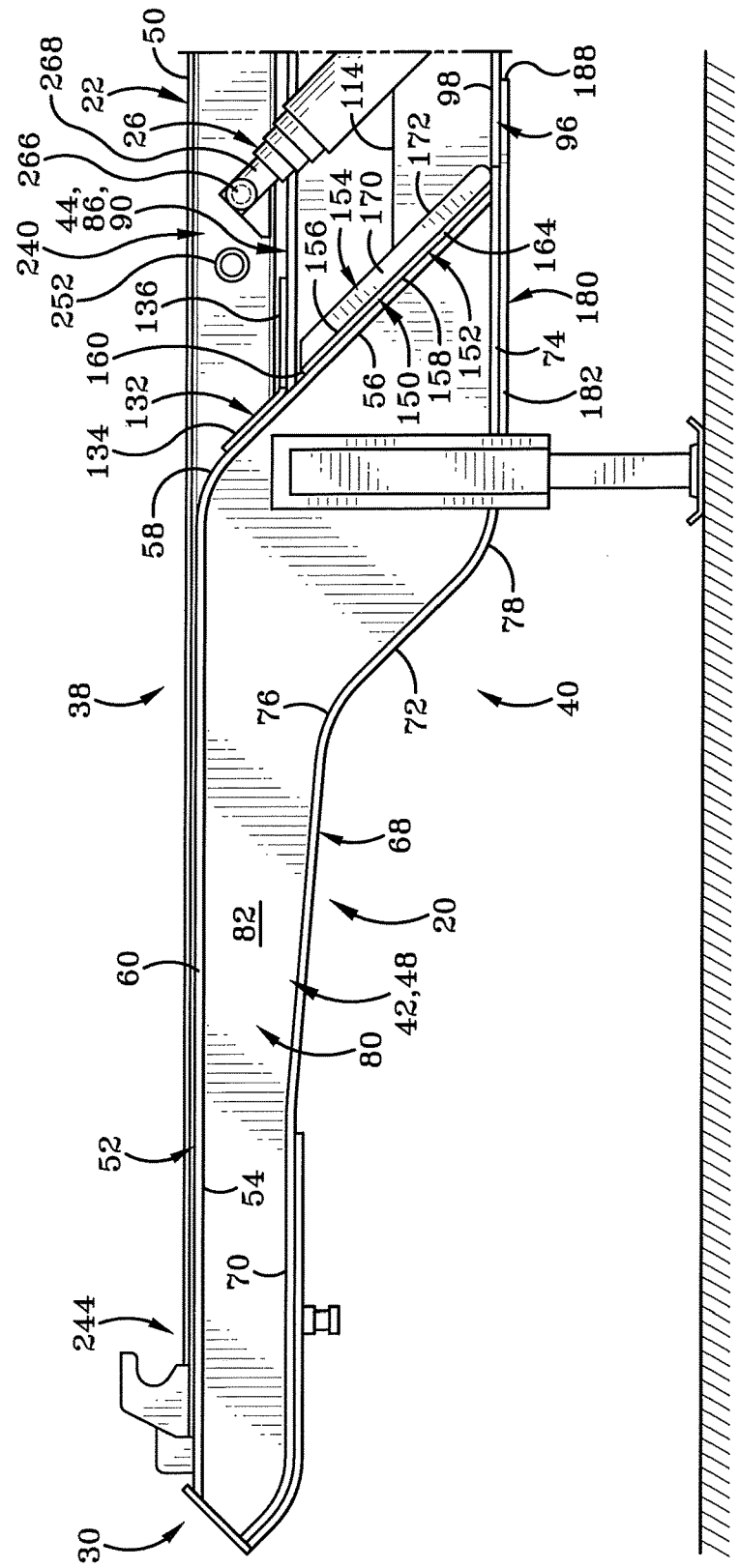
FIG. 3 is an enlarged side elevation view of the front section of the first embodiment of the present disclosure.

Referring now to FIG. 2 and FIG. 2A, depicting only trailer frame 20, frame 20 includes a forward end 30, spaced apart and positioned forward from a rear end 32 that therebetween define a longitudinal direction. Frame 20 includes a left side 34 spaced apart from a right side 36 that therebetween define lateral direction. Frame 20 has a top side 38 that is spaced apart and positioned above a bottom side 40 that define a vertical direction therebetween. Frame 20 includes front section 42 positioned longitudinally forward of rear section 44. The front section 42 and rear section 44 are connected generally by a neck section 46.

Turning now to the elements or components found on front section 42 of trailer 20 which are primarily fabricated from aluminum, and in some instances exclusively from aluminum, front section 42 includes two longitudinally extending parallel support members or rails 48, 50. Various components are described with reference to one of the left and right support members or rails 48, 50 for brevity. However, it is to be clearly understood that as two support members or rails are spaced apart and parallel to each other complementary components are found on each left and right side of front section 42. Front section 42 further includes a first flange 52 comprising a forward first portion 54 extending longitudinally in a generally horizontal manner. First portion 54 is made from aluminum and has an upwardly facing top surface and a downwardly facing bottom surface. First flange 52 is made from aluminum and further comprises a rear second portion 56 that extends downwardly and rearwardly from a rear end of first portion 54. First portion 54 and second portion 56 are connected by a rounded or filleted portion 58. Second portion 56 is made from aluminum and comprises a top surface that faces upwardly and rearwardly and has a bottom surface that faces downwardly and forwardly. An angle 51 is defined between the bottom surface of first portion 54 and the bottom surface of second portion 56. This angle 51 between portions 54, 56 is greater than 90° but less than 180°. In the shown embodiment the angle is approximately greater than 120° and less than 150°. More particularly, the angle 51 shown in FIG. 2 is approximately 135°.

The width of first flange 52 is defined and extends between outer edge 60 and inner edge 62 of flange 52. An outer width 64 of front section 42 is measured from outer edge 60 on first or left support member 48 to outer edge 60 on second or right support member 50. An inner width 66 of front section 42 is measured from inner edge 62 on member 48 to inner edge 62 on member 50. In the sample embodiment, outer edge 60 is the rightmost portion of trailer 10 along right support member 50 and outer edge 60 is the leftmost portion of trailer 10 along left support member 48.

A second S-shaped support flange 68 is made from aluminum and is positioned directly below first flange 52 on first support member 48 of front section 42. S-shaped flange 68 includes a forward first portion 70, a downwardly and rearwardly extending middle portion 72, and a longitudinally extending horizontal rear portion 74. The rear end of forward portion 70 is connected to the upper end of middle portion 72 by an arcuate connector 76. The lower end of middle portion 72 is connected to the forward end of rear portion 74 by a second arcuate connector 78. Together, portions 70, 72, 74, 76, and 78 collectively define S-shaped flange 68. S-shaped flange 68 further includes an upwardly facing top surface and a downwardly facing bottom surface. An angle 53 is defined between the bottom surface of forward portion 70 and the bottom surface of middle portion 72. The angle 53 between the bottom surfaces of 70, 72 is preferably greater than 90° but less than 180°. A second angle 55 on S-shaped support flange 68 is formed between the upper surface of middle portion 72 and the upper surface of rear portion 74. The second angle 55 is preferably greater than 90° and less than 180°.

An L-shaped web 80 is made from aluminum and extends between the lower surface of the first flange 52 and the upper surface of second S-shaped flange 68. The web 80 extends vertically and includes an outwardly facing first surface 82 and an inwardly facing second surface 84. First surface 82 faces left on left rail 48 and first surface 82 faces right on right rail 50. Second surface 84 faces right on left rail 48 and second surface 84 faces left on right rail 50. Preferably, web 80 is welded to the bottom surface of flange 52 and the top surface of S-shaped flange 68. Alternatively, clearly a plurality of support brackets, or other ways to connect web to the two respective flanges, 52, 68 are entirely possible.

Rear section 44 is made from aluminum and comprises longitudinally extending parallel support members, 86, 88 spaced apart from each other comprising complementary components. For brevity, it is to be understood that the components are explained on first support member 86 of rear section 44, however the described components are mirrored on the second support member 88 defining rear section 44.

Rear section 44 comprises a horizontal flange 90 extending longitudinally from a front end of support member 86 to a rear end of support member 86. Horizontal flange 90 is made from aluminum and includes an upwardly facing top surface and a downwardly facing bottom surface. The width of horizontal flange 90 is defined by an outer edge 92 and an inner edge 94.

An overall outer width 120 of rear section 44 is measured from outer edge 92 of first member 86 to outer edge 92 of second member 88. Similarly, an inner width 122 distance of rear section 44 is defined and measured between inner edge 94 of support member 86 to inner edge 94 of support member 88.

A second S-shaped flange 96 extends longitudinally directly below first horizontal flange 90 on rear section 44. S-shape flange 96 includes an upwardly facing top surface and a downwardly facing bottom surface. Further, S-shape flange 96 includes a forward portion 98, a middle portion 100, and a rear portion 102. Front portion 98 is connected to middle portion 100 by an upwardly curving arcuate member 104. Middle portion 100 extends upwardly and rearwardly from arcuate member 104 towards the downwardly curving arcuate member 106. Rear portion 102 extends rearwardly towards rear end 32 from arcuate member 106. Further, middle portion 100 top surface faces upwardly and forwardly. The bottom surface of portion 100 faces downwardly and rearwardly. A web 108 is connected to and extends vertically between flange 90 and S-shaped flange 96. Web 108 includes an outwardly facing outer surface 110 and an inwardly facing inner surface 112.

When viewed in cross section, support members 86 and 88 define an I-beam. In the shown embodiment, the I-beam structure of support member 86 and 88 are created by two T-bars welded together along a center seam 114. However, as one would understand in the art, an I-beam could be constructed in multiple ways to define members 86, 88. In accordance with a preferred embodiment of the present disclosure the I-beam member 86 and I-beam member 88 are preferably constructed of aluminum. The aluminum I-beam 86 gives frame 20 a light-weight design yet still structurally strong enough to support the load demands required by a commercial roll off trailer 10 for supporting container 15 thereon.

When viewed from the side, I-beams 86, 88 have a forward edge 116 that extends downwardly from the top towards the bottom. A downward sloping forward edge 116 is complementary with a downwardly and rearwardly extending flange portion 204 on a lateral support 200.

I-beams 86, 88 are spaced parallel from each other at an outer width of 120 and an inner width of 122. Outer width 120 is defined from outer edge 92 of I-beam 86 to outer edge 92 of I-beam 88. Inner width 122 is defined between inner edge 94 of I-beam 86 to inner edge 94 of I-beam 88. Outer width 120 of rear section 44 is smaller than the inner width 66 of front section 42. The more narrow width of rear section 44 allows the two parallel I-beams 86, 88 to be positioned in the space defined by inner width 66. This creates the stepped-out nature of the neck 46.

Four support plates 260 are shown, two on each respective side of frame at the rear end of I-beams 86,88. On the support plates 260, each have an aperture formed therein in lateral alignment configured to receive a pivot pin therethrough for attaching the table 22 in a pivotable manner.

As depicted in FIG. 4, table 22 includes a pair of longitudinally extending support rails, 240, 242 spaced apart and parallel relative to each other. Table 22 includes a forward end spaced apart and opposite from a rear end. Forward end 244 is positioned rearwardly from forward end 30 of frame 20. Rear end 246 of table 22 is positioned rearwardly of rear end 32 of frame 20.

Looking to rails 240, 242, each includes a general box frame design having two vertically extending sidewall members spaced apart integral with two laterally extending top and bottom walls connected at corners defining an interior space therein. A pad 250 is positioned above and resting on the top surface of each rail 240, 242 respectively. Further, a plurality of rollers 252 are connected to each of rail 240, 242 and extend laterally outward from the vertically extending outer sidewall of box frame defining, 240, 242. An outer edge 254 of roller 252 is laterally inward from inner edge 62 of the first and second support members, 48, 50. Further, roller 252 is at a vertical height lower than the upper surface of the first forward portion 54 on flange 52. The lateral width from outer edge 254 attached to rail 240 to outer edge 254 attached to rail 242 is less than inner width 66 of front section 42.

The smaller width of table 22 allows table 22 to rest between the first and second support members, 48, 50 at the front section 42. Looking towards the rear section 44 of trailer frame 20, table top 22 is positioned vertically above horizontal flange 90 on both support member 86, and support member 88. At the neck section 46, tabletop 22 is both above plate 132 and positioned inwardly of plate 132.

Table top 22 is connected to frame 20 by an aligned pivot-pin relationship. On the trailer frame 20, a pivot-pin support plate 260 is mounted on each side 34, 36 of frame 20 adjacent rear end 32. Table top 22 has a downwardly extending pivot mount 262 adjacent end 246. Pivot mount 262 nests in the space between the two plates 260 on each respective side of frame 20. A pivot pin 264 extends through the apertures in support 260 and mount 262 to create a pivot joint. This pivot joint permits table 22 to pivot up and down allowing a container 18 to be loaded or unloaded onto table top 22 in accordance with an aspect of the present disclosure.

Forward from the rear end 246, a hydraulic lift arm support mount 266 is on the outwardly facing vertical surface of rail 240, and 242 respectively. Arm mount 266 is in communication with telescoping arm 268 of hydraulic lift 26. A bottom end of hydraulic lift 26 is connected to the rear section 44 of frame 20. Hydraulic lift arm 26 permits table 22 to be pivoted and lifted relative to frame 20 between a first table 22 position horizontal and substantially parallel to the ground surface and a second lifted table 22 position inclined relative to the ground surface. The second table 22 position (FIG. 1A) is used to load and unload container 18 onto table 22. First position or horizontal position (FIG. 1) is used to transport or store container 18. When table 22 is in the first table position, table 22 is resting horizontally atop frame 20, arm mount 266 and telescoping arms 268 are positioned rearwardly from the neck section 46 on rear section 44. Further, the outer width between the left and right hydraulic arms 26 is substantially similar to the outer width 64 of front section 42.

With continued reference to FIG. 4, container moving hydraulic system 28 comprises a first moving trolley assembly 280 including a moveable slide plate 282 on the trolley assembly 280, a cable 284, and a first actuator 286.

Moveable plate 282 includes an upwardly facing top surface 288 opposite a downwardly facing bottom surface 290, an anchor link 292 formed in and extending through plate 280. Plate 280 is positioned between rails 240, 242 and configured to longitudinally slide therebetween. A track may be formed in rails 240, 242 to facilitate this sliding relationship.

First actuator 286 includes a first end 294 longitudinally spaced apart from a second end. Actuator 286 in one particular embodiment is a hydraulic piston assembly including an outer casing 382 receiving a moveable piston 298 and hydraulic fluid (not shown) therein. The outer casing 382 defines second end and moveable piston 298 defines first end 294. First end 294 is coupled to slide plate 282 and second end terminates rearwardly from first end 294. In one embodiment, second end is coupled to a cross-support or piston seat on table 22, however locations and manners of coupling second end 295 to container engaging platform 22 are contemplated.

In one embodiment, an additional third actuator 300 is spaced apart and parallel to first actuator 286 and moveable in simultaneous cooperation via hydraulics in a manner and direction so similar to that of first actuator 286. Second actuator 360 is also coupled to slide plate 282 at its first end and terminates rearwardly from first end, preferably at piston seat adjacent that of the first actuator 286.

Cable 284 includes an attachment member, preferably a hook, at a cable first end and the cable 284 terminates at an opposite cable second end. Cable 284 is coupled to platform 22 at the cable second end. Cable 284 is strung or threaded longitudinally forward through anchor link 292, then rearwardly towards a first sheave connected to platform 22. Cable 284 is threaded around first sheave and extends longitudinally forward towards a second sheave connected to trolley 280. Cable 284 is threaded around second sheave on trolley 280 and extends longitudinally rearward from trolley 280.

Figure 5:
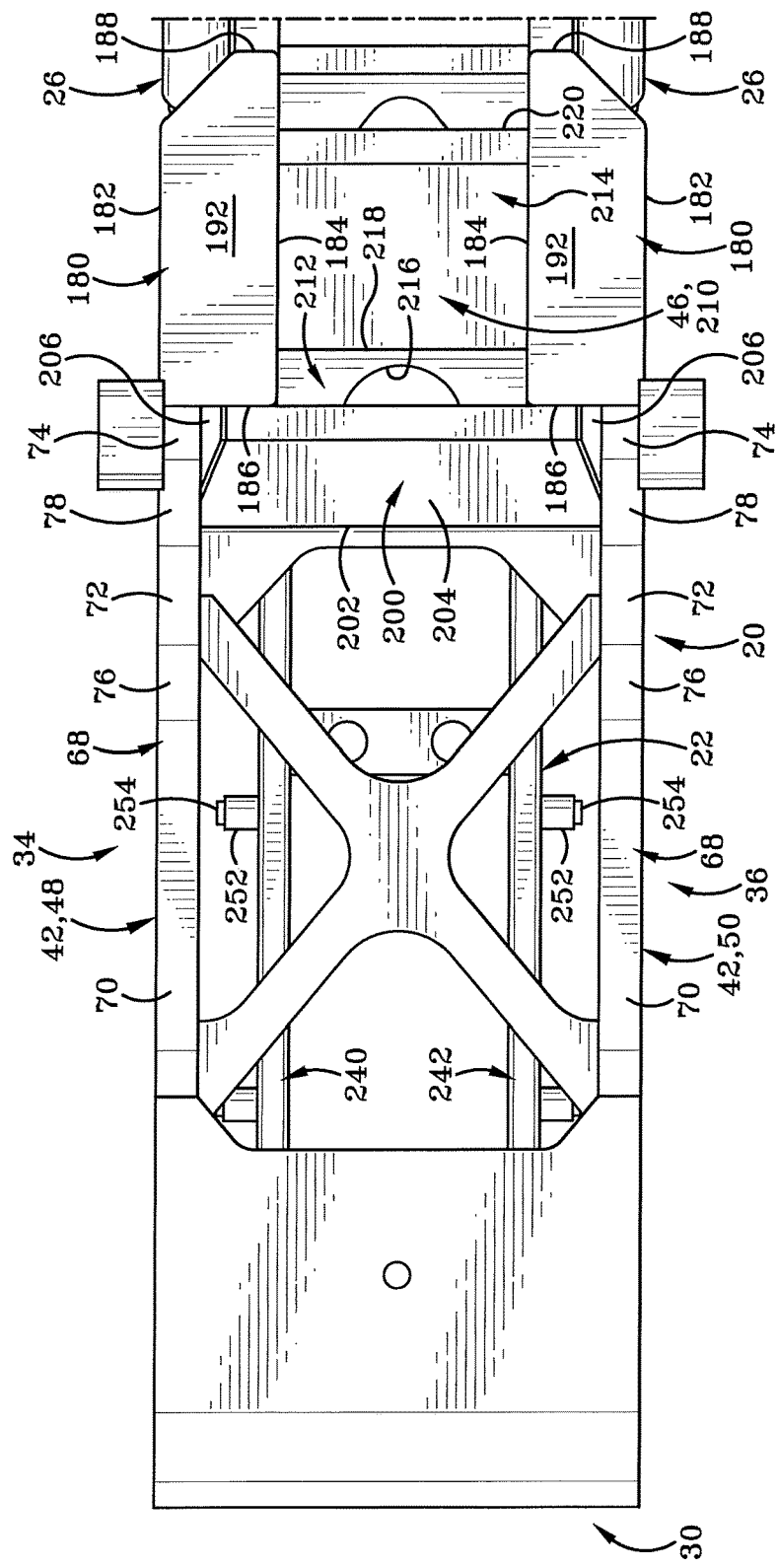
FIG. 5 is an enlarged bottom plan view of the front section of the first embodiment.

As depicted in FIG. 5, neck section 46 further comprises a longitudinally extending horizontal planar bottom flange 180. Planar bottom flange 180 includes an outer edge 182 spaced apart and generally parallel to an inner edge 184. Planar bottom flange 180 further comprises a leading edge 186 spaced apart in extending parallel to and positioning forwardly from a rear edge 188. Further edges define an upwardly facing top surface and a downwardly facing bottom surface show as 190, and 192 respectively. Bottom flange 180 is positioned beneath the bottom surface of rear section S-shaped flange 96. Planar flange 180 is oriented such that it spans all four gap distances 124, 126, 128, and 130.

Figure 6:
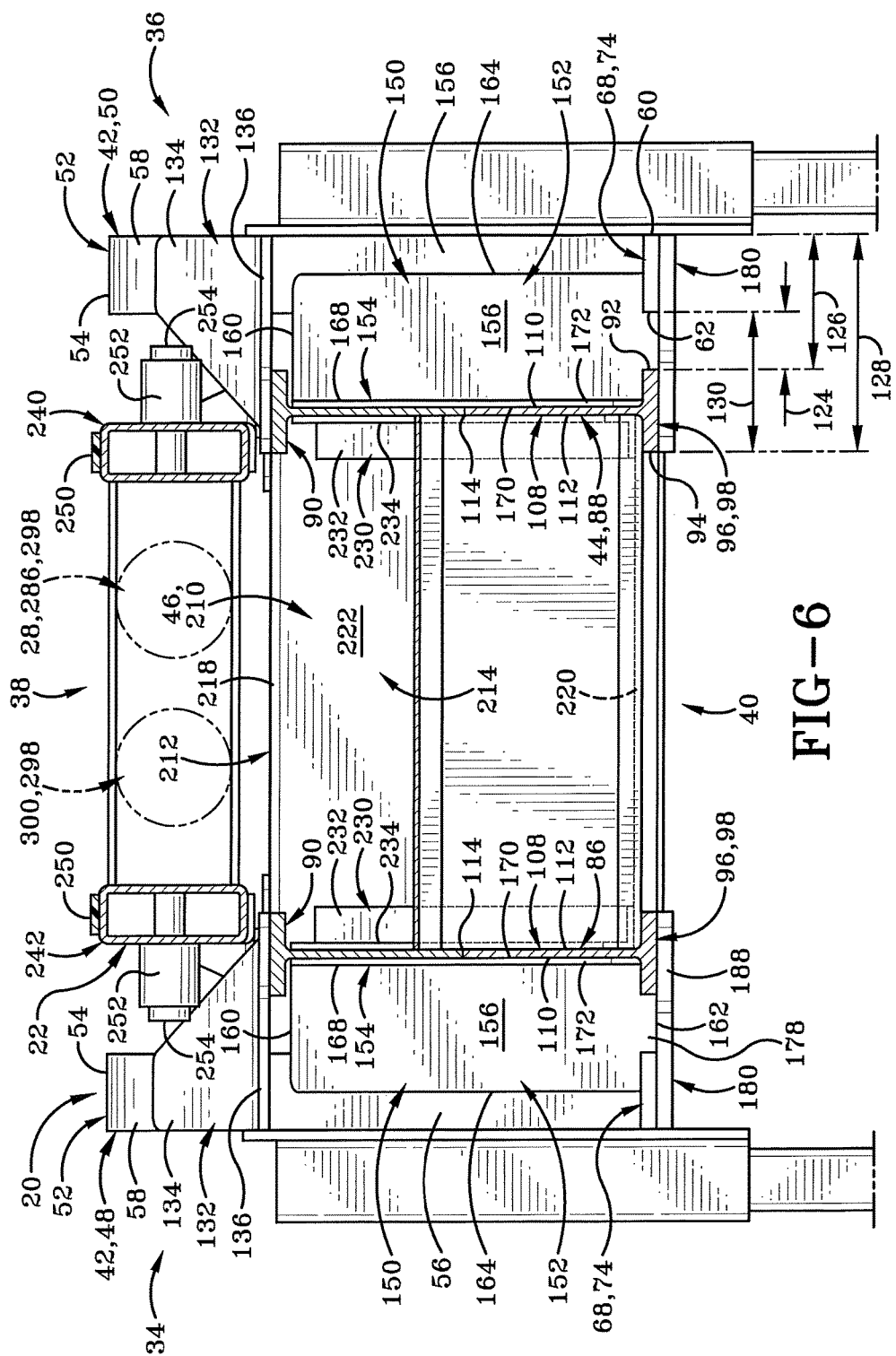
FIG. 6 is a cross-sectional view taken along line 6-6 in FIG. 4.
Figure 7:
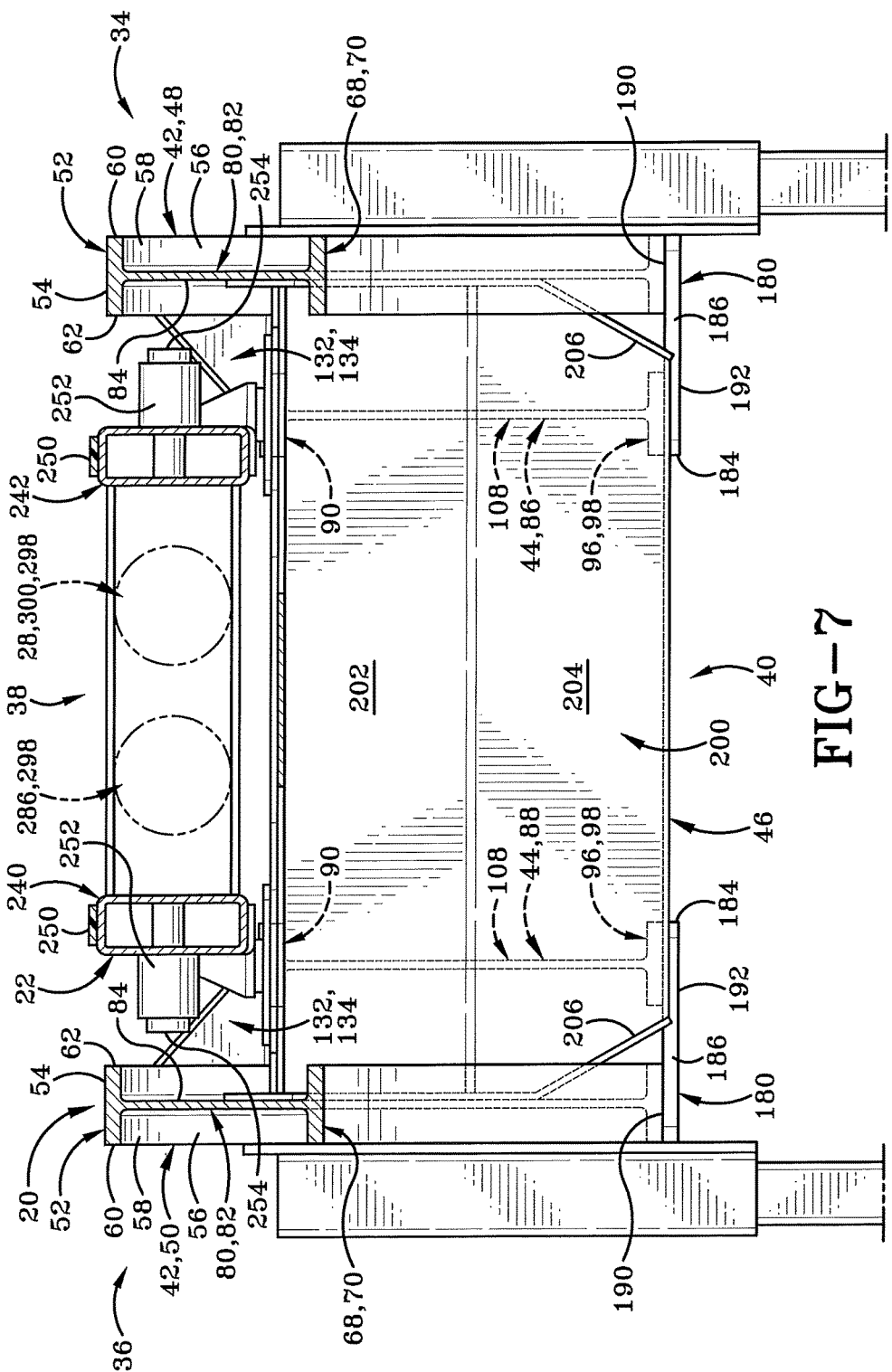
FIG. 7 is a cross-sectional view taken along line 7-7 in FIG. 4.

With reference to FIG. 6, a plurality of gap distances exist when rear section I-beams 86, 88 are positioned inwardly from the front section support members 48, 50. A first gap distance 124 extends from outer edge 92 to inner edge 62. A second gap distance 126 extends from outer edge 92 of I-beam 86, 88 to outer edge 60. A third gap distance 128 extends from inner edge 94 of I-beam 86, 88 to outer edge 60 of front support member 48, 50. A fourth gap distance 130 extends from inner edge 94 to inner edge 62.

Neck section 46 includes components and elements that span the various gap distances, 124, 126, 128, and 130. The manner in which the neck 46 components are constructed permits I-beams 86,88 to preferably be made of a lightweight aluminum. A V-shaped flange 132 connects front section 42 to rear section 44. V-shaped flange 132 includes a forward panel section 134 and a rear panel section 136 bent about a center seam 138 to define the V-shape. Forward section 134 of V-shape flange 132 includes an upwardly and rearwardly facing top surface and a downwardly and forwardly facing bottom surface. Rear section 136 includes an upwardly facing top surface and a downwardly facing bottom surface. V-shaped flange 132 includes an inner edge 140 and an outer edge 142. Inner edge 140 partially extends longitudinally directly above inner edge 94. Outer edge 142 extends downwardly and rearwardly, closely adjacent outer edge 60 on rear second portion 56. V-shaped flange 132 further comprises a first spanning edge 144 extending rearwardly and inwardly from outer edge 142. Spanning edge 144 spans and extends along and covers both the first gap distance 124 and the second gap distance 126. A second spanning edge 146 extends from front of inner edge 140 upwardly and outwardly. Second spanning edge 146 spans across the fourth gap distance 130 and a portion of the third gap distance 128, and first gap distance 124.

Bottom surface of rear section 136 is mounted above top surface of flange 90. Bottom surface of forward section 134 of flange 132 is mounted to top surface of rear second portion 56. In the shown embodiment V-shaped flange 132 is at a height below forward portion 54 and seam 138 extends orthogonally to the longitudinal orientation of I-beams 86, 88 and support members 48, 50.

First angle α on flange 132 is defined between the forward panel 134 and the rear panel 136, the first angle α is supplementary (they add to 180°) with a second angle formed between second portion 56 on the first flange 52 and a rear portion 74.

With continued reference to FIG. 6 (also depicted in FIG. 2A), an L-shaped flange 150 spans the entire first gap distance 124, and spans a portion of each the second gap distance 126, the third gap distance 128, and the fourth gap distance 130. L-shaped flange 150 comprises a first leg 152 and a second leg 154. Leg 152 comprises an upwardly and rearwardly facing first surface 156 and a downwardly and forwardly facing second surface 158. First leg 152 comprises a top edge 160 spaced apart from a bottom edge 162. Top edge 152 is below bottom surface of panel 136. Preferably top edge 160 is below bottom surface of flange 90. First leg 152 further comprises an outer edge 164 and an inner edge along a seam 166. Second leg 154 includes an outwardly facing first surface and an inwardly facing second surface. The outwardly facing surface is shown generally as 168. The inwardly facing second surface is shown generally as 170. Inner surface 170 is mounted to web outer surface 82. Second leg 154 further comprises a top edge when viewed from the side, shown generally as 172 which extends downwardly and rearwardly when viewed from the side in a manner complementary to forward edge of I-beam 86 and the angle α of V-shaped flange 132. A bottom tongue 178 of leg 152 is positioned between inner edge 62 of rear portion 74 and the outer edge 92 of forward portion 98.

When second leg 154 is attached to web outer surface 82, leg 152 extends outwardly across gap distance 124 and the second surface 158 contacts a portion of the surface of member 56. In the shown embodiment leg 152 spans approximately half the width of flange 56, however, in alternative, an embodiment leg 152 may span the entire width of leg 56 from outside edge 60 to inside edge 62. Further, it is contemplated that leg 152 will be welded to rear portion 56 of the front section or any alternative connected via bolts as ordinarily understood in the art. Similar to I-beams 86, 88 it is further contemplated that L-shaped flange 150 will be constructed from aluminum to provide a lightweight but strong support. The shape of L-shaped flange 150 permits the lightweight aluminum construction as opposed to conventional steel thus reducing the overall weight of trailer 10.

When viewed in cross section, as shown in FIG. 6, the width of bottom flange 180 is equal to the width of third gap distance 128. Inner edge 184 is positioned directly below inner edge 94 and outer edge 182 is positioned directly, vertically below outer edge 60. Forward edge 186 of planar bottom flange 180 is preferably vertically aligned with leading edge of V-shaped flange 132 (also depicted in FIG. 8). Rear edge 188 is positioned rearwardly from L-shaped flange 150. In the preferred embodiment, bottom flange 180 is welded or bolted to S-shaped flange 96; however other ways of connecting the two together are contemplated.

A center connection member 200 extends inwardly from web 80 spanning the first gap distance 124 and the fourth gap distance 130. Inner support member 200 comprises a vertically extending first portion 202, a downwardly and rearwardly extending second portion 204, and two side angled support portions 206. Member 200 extends laterally from inner surface 84 on portion 58 to inner surface 84 on member 50.

With continued reference to neck section 46, a laterally extending support member 210 extends between inner surface 112 of first support member 86 to inner surface 112 of second support member 88. Member 210 is positioned rearwardly from lateral support member 200. Inner support member 210 includes an upper planar portion 212, and a lower planar portion 214. An aperture is formed in upper planar portion 212. Aperture 216 is approximately centered laterally and longitudinally in planar portion 212. Planar portion 212 is positioned beneath and closely adjacent the bottom surface of flange 90. A front edge of planar portion 212 is positioned closely adjacent center connection member 200. Planar portion 212 extends rearwardly from the front edge towards a bending seam 218. Aperture 216 is positioned between the forward edge and seam 218. Planar portion 214 extends downwardly and rearwardly from seam 218 towards a bottom edge 220. The angle formed between portion 212 and portion 214 is preferably equal to angle α on flange 132. Further, portion 214 has an upwardly and rearwardly facing upper surface 222 and a downwardly and forwardly facing bottom surface. The lateral edges of portion 214 are closely adjacent inner surface 112 of support members 86, 88, respectively. The upper surface 222 of planar portion 214 is bound by the lateral edges, seam 218 and bottom edge 220.

An L-shaped flange 230 supports the connection of planar portion 214 of 210 to inner surface 112 of support members 86, 88, respectively. L-shaped flange 230 includes a first leg, 232 and a second leg 234. First leg 232 includes a forwardly and downwardly facing first surface spaced apart and opposing an upwardly and rearwardly facing second surface. First surface of leg 232 is closely adjacent and preferably in contact with outer upwardly facing surface 222 of planar portion 214. Second leg 234 includes a laterally inwardly facing first surface spaced apart from a laterally outwardly facing second surface. The outwardly facing second surface of leg 234 is closely adjacent and preferably contacts inner surface 112 of web on members 86, and 88 respectively.

Generally, L-shape flange 230 extends downwardly and rearwardly at an angle similar to member 56. A top edge is closely adjacent the bottom surface of flange 90 and a bottom edge of member 230 is closely adjacent the top surface of S-shaped flange 96. Second leg 234 is laterally aligned with second leg 154, spaced apart on opposing side web 108 as shown in the cross section view of FIG. 6.

Figure 8:
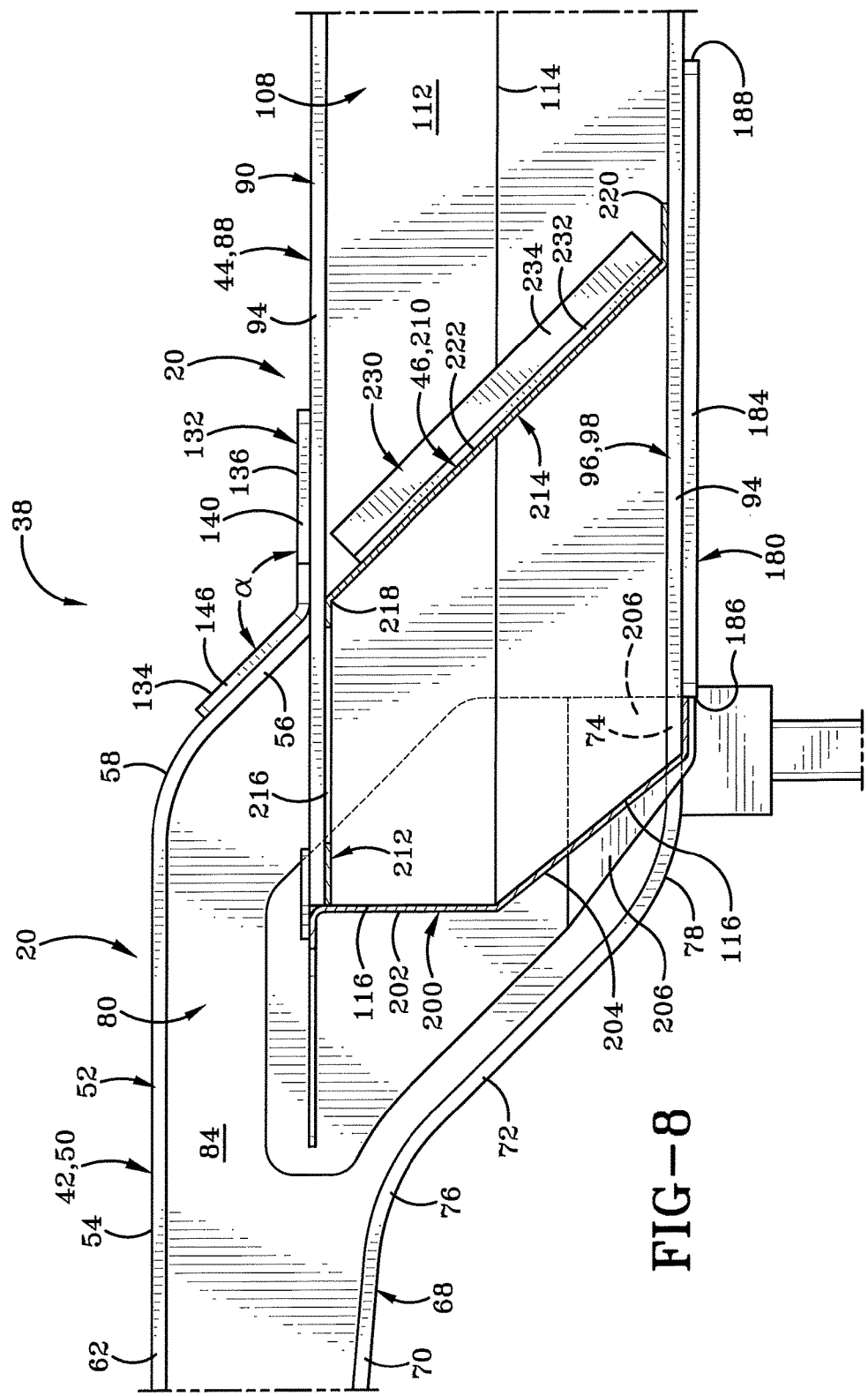
FIG. 8 is an enlarged cross-sectional view of the stepped out neck section on the first embodiment taken along line 8-8 in FIG. 2.

As depicted in FIG. 8, an angle α is formed between the top surface of 134 and the top surface of 136 on V-shape flange 132. Angle α is greater than 90° but less than 180°. Further, angle α is supplementary to the angle formed between the bottom surface of flange 132 and the top surface of flange 90 on member 88. Preferably, angle α is also equal to the angle formed between portion 54 and portion 56 on front flange 52. In one particular embodiment, angle α is about 135 degrees.

An exemplary trailer 10 identified throughout this application is detailed in U.S. Provisional Patent Application Ser. No. 62/045,842 filed Sep. 4, 2014, entitled ALUMINUM ROLL OFF TRAILER HAVING A STEPPED OUT FRONT END OR NECK, and U.S. patent application Ser. No. 14/844,729 claiming priority to this Prov. Application No. 62/045,842, which are commonly owned with the present application at the time of filing and the entirety of which is hereby by incorporated by reference as if fully rewritten.

Figures 9, 10, 11:
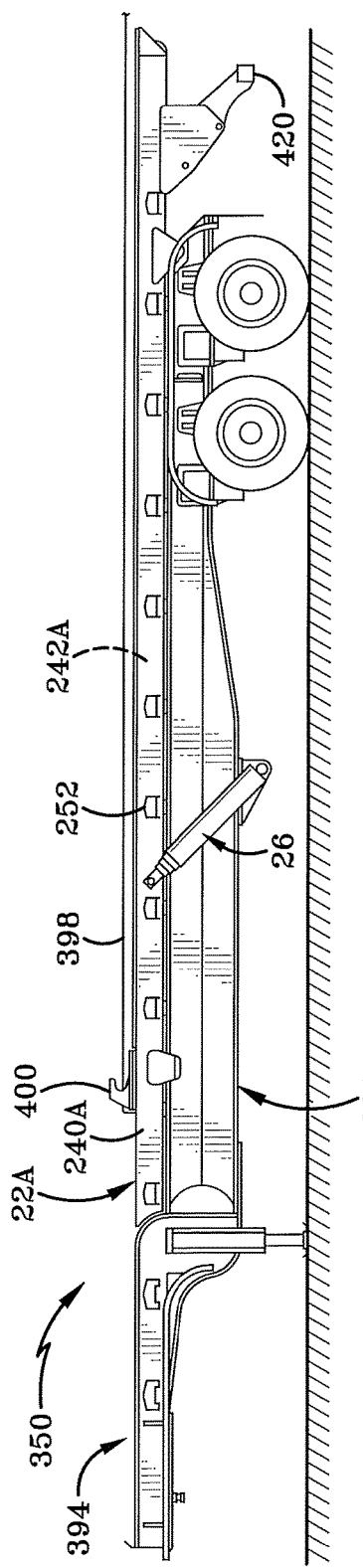
FIG. 9 is a side elevation view of a second embodiment of the present disclosure.
FIG. 10 is a schematic representation indicating that FIG. 10A, FIG. 10B, and FIG. 10C are enlarged views and should be lined end to end respectively to form an enlarged top view of the second embodiment of the present disclosure.
FIG. 11 is a schematic representation indicating that FIG. 11A, FIG. 11B, and FIG. 11C are enlarged views and should be lined end to end respectively to form an enlarged bottom view of the second embodiment of the present disclosure.

Turning now to FIGS. 9-22, a second embodiment of the present disclosure is shown generally as 350. As depicted in FIG. 9 the second embodiment trailer 350 includes a frame 20A, a table top 22A pivotably mounted to frame 20A, and a container moving hydraulic system 352 with additional components than that of system 28 depicted in FIGS. 1-8.

Figure 10A:
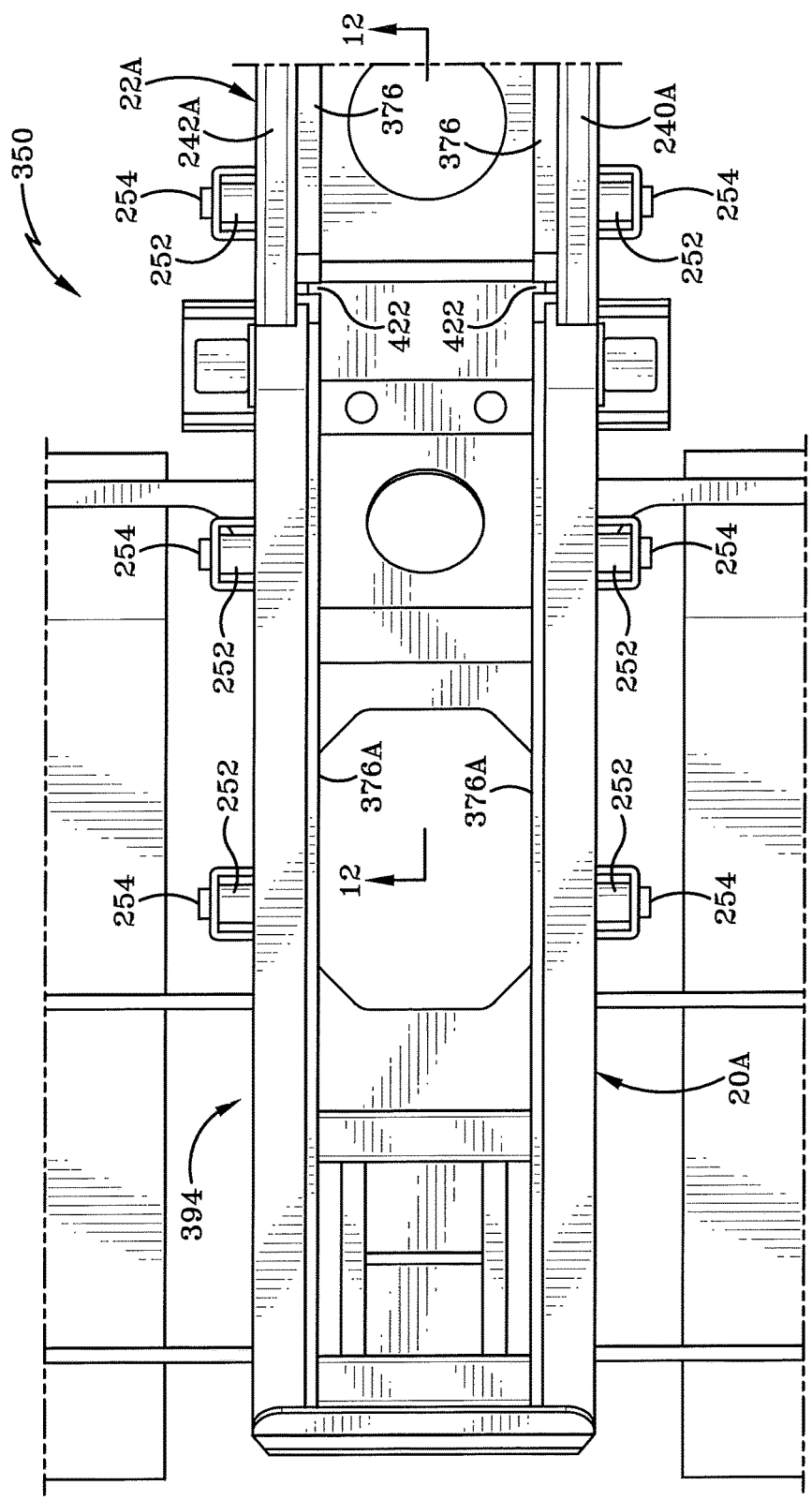
FIG. 10A is an enlarged top plan view of a front portion of the second embodiment of the present disclosure.
Figure 10B:
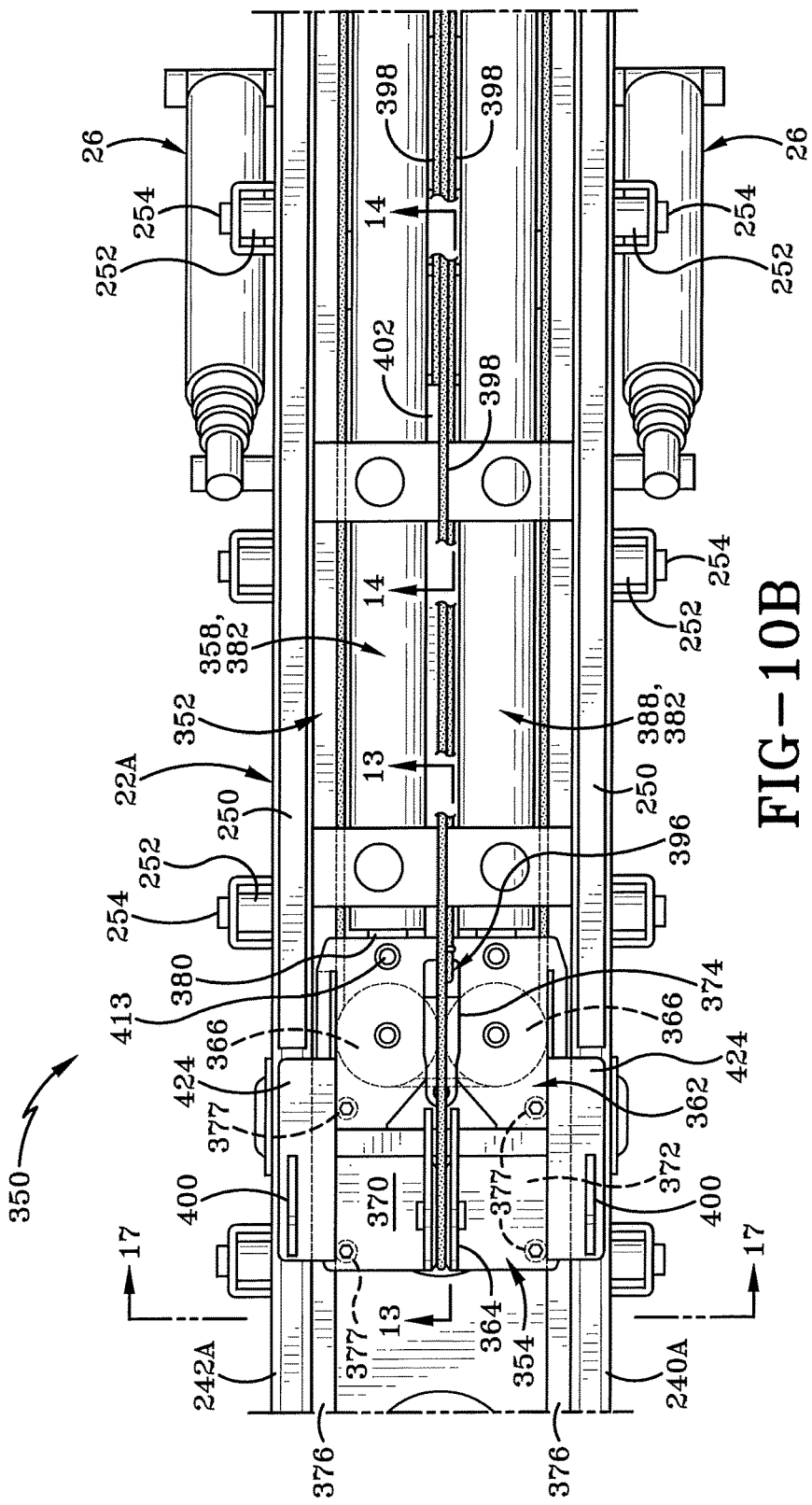
FIG. 10B is an enlarged top plan view of a middle section of the second embodiment.
Figure 11A:
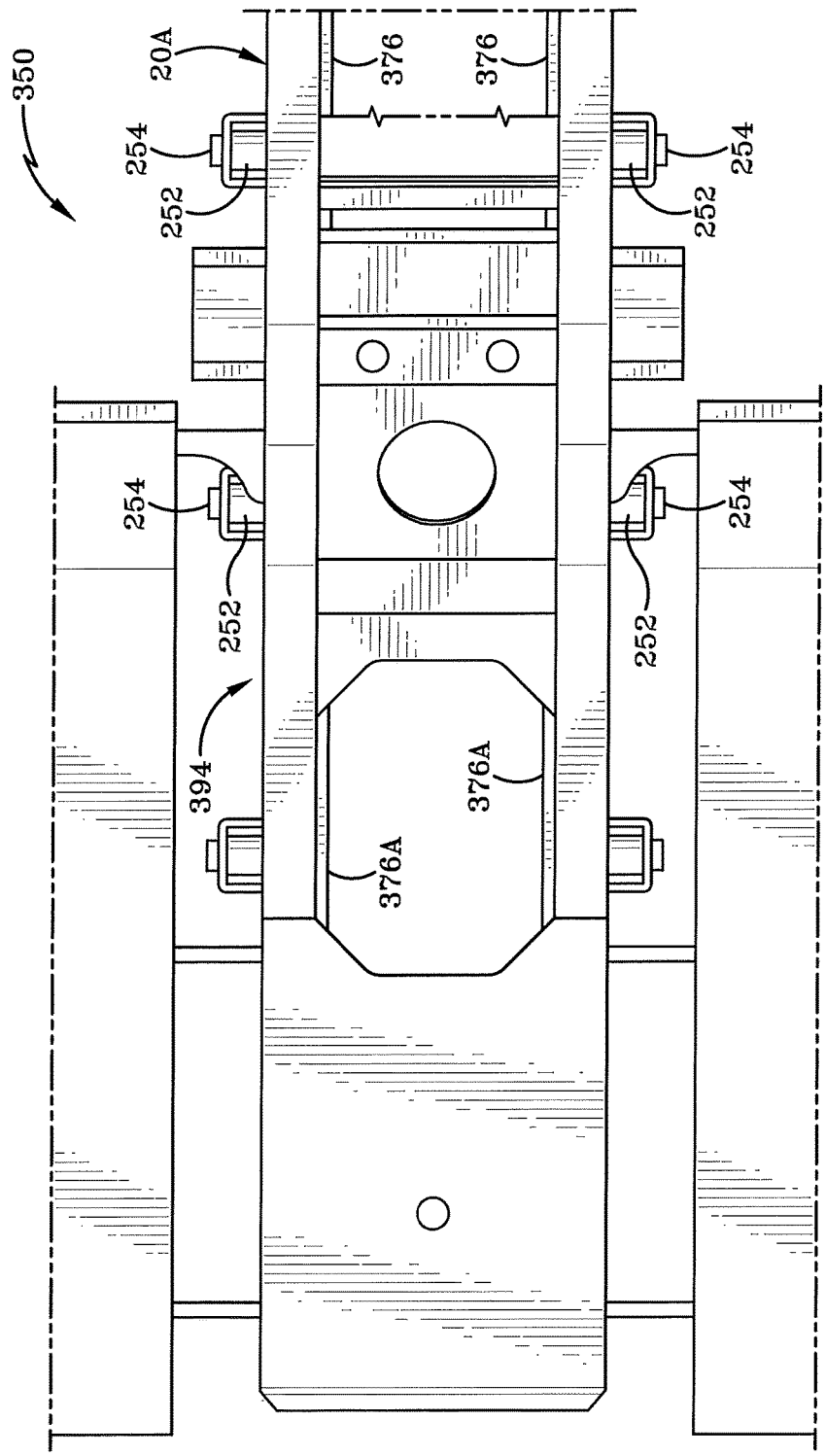
FIG. 11A is an enlarged bottom plan view of a front section of the second embodiment.
Figure 11B:
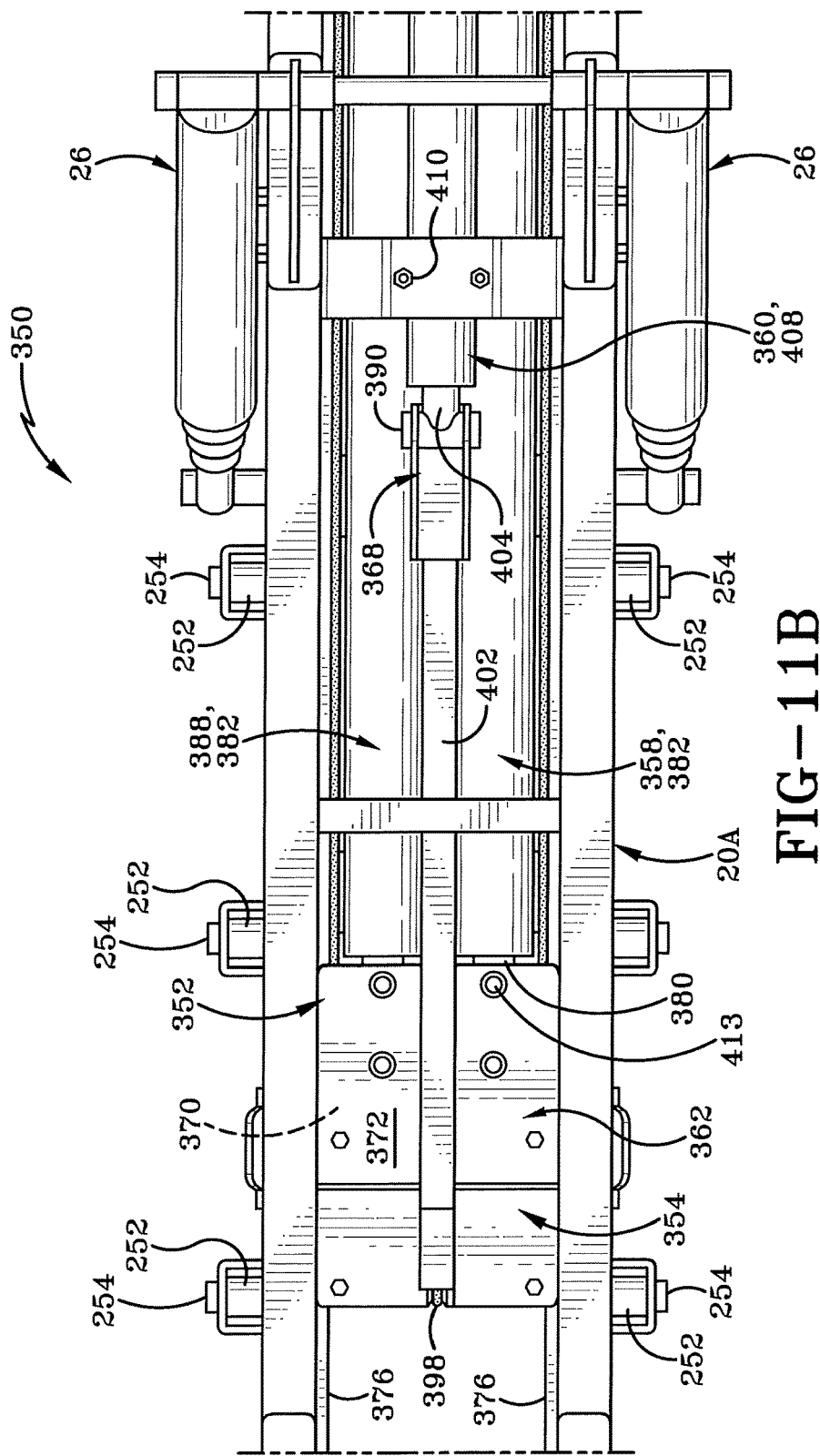
FIG. 11B is an enlarged bottom plan view of a middle section of the second embodiment.
Figure 11C:
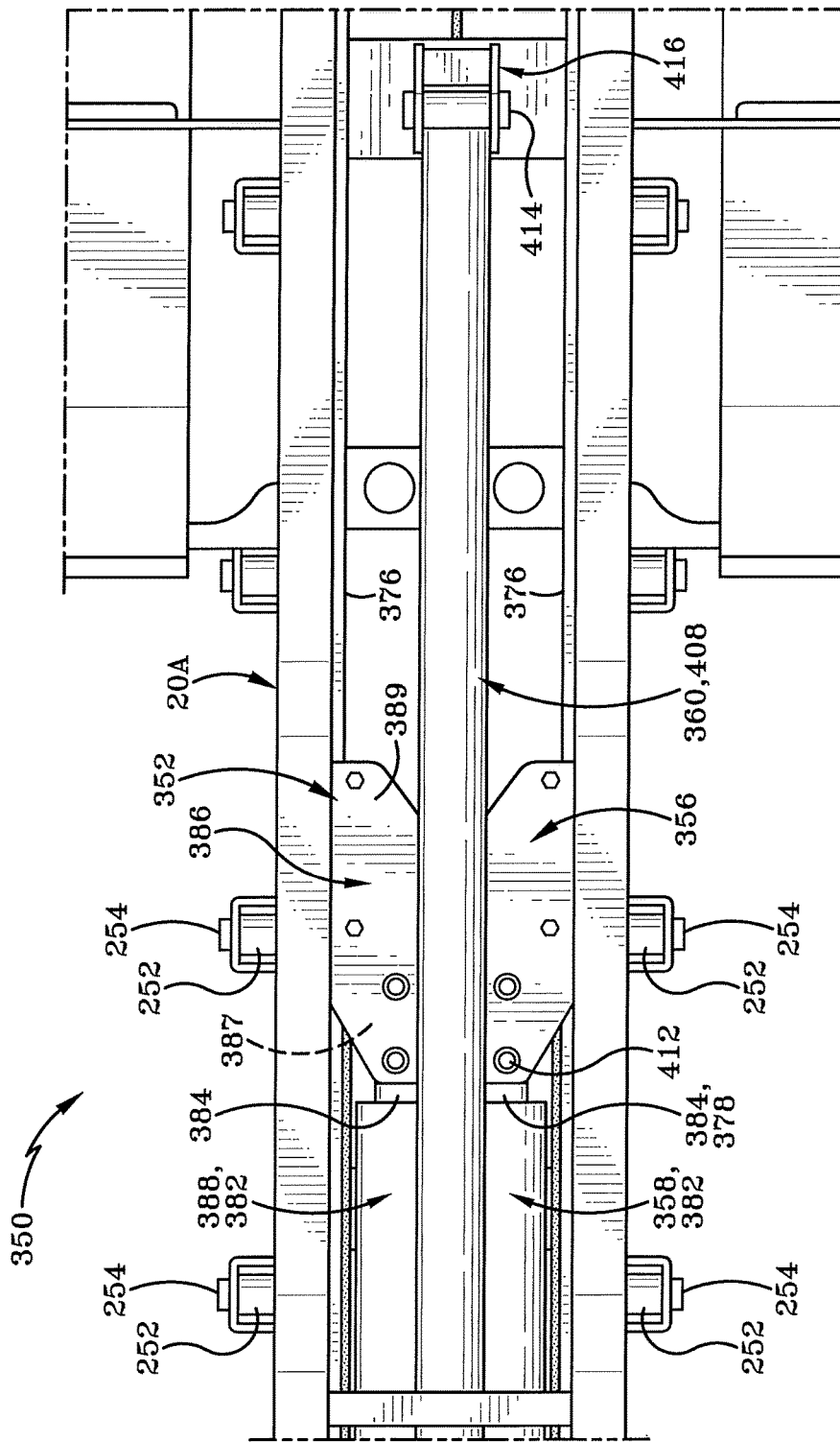
FIG. 11C is an enlarged bottom plan view of a rear section of the second embodiment.

FIG. 10 is a schematic representation indicating that FIG. 10A, FIG. 10B, and FIG. 10C are enlarged views that should be aligned as shown to reveal a top plan view of the second embodiment 350 as a whole. Similarly, FIG. 11 is a schematic representation indicated that FIG. 11A, FIG. 11B, and FIG. 11C are enlarged views that should be aligned as shown to reveal a bottom plan view of the second embodiment 350 as a whole.

With primary reference to FIGS. 10A-11C, container moving hydraulic system 352 includes a first trolley assembly 354, a second trolley assembly 356, a first actuator 358, and a second actuator 360. These components are connected to a roll off trailer 350 and cooperate together to move a container from a first container position located on the ground, then to a second container position located between a front end and a rear end of the trailer, and approximately longitudinally mid-way relative to table 22A, then to a third container position located adjacent the forward end of the trailer 350.

As depicted in FIG. 10A, rails 240A, 242A on table 22A include a pair of tracks 376 configured to slidably receive a slide plate. Frame 20A includes a pair of tracks 376A formed in the forward portion 394 of trailer 350 configured to slidably receive same said slide plate. Tracks 376 and tracks 376A are longitudinally aligned and spaced apart from each other defining a gap 422. A friction reducing pad 375 may be connected to tracks 376, 376A to further encourage the sliding relationship. First trolley assembly 354 and second trolley assembly 356 each slide along the same tracks 376. Because of this, in all instances the first trolley assembly will always be forward relative to the second trolley assembly. As will be described in later detail below, when the container is in the grounded position, the first trolley assembly is forward and adjacent the second trolley assembly. When the container is hoisted onto table top 22A, the first trolley assembly is forward of and distal second trolley assembly.

As depicted in FIG. 10B, first trolley assembly 354 includes two connected moveable slide plates 362 coupled to the first actuator 358, a vertically oriented first sheave 364, a laterally oriented second sheave 366, and a mounting bracket 368 on a downwardly facing side of the trolley assembly 354.

Moveable slide plates 362 include an upwardly facing top plate 370 spaced apart from a downwardly facing bottom plate 372. A space exists between top and bottom plate 370, 372 defining a generally sandwich-like relationship. Additional components of the first trolley assembly are sandwiched between top and bottom plates 370, 372.

Laterally oriented sheave 366 is sandwiched between top and bottom plates 370, 372. In one particular embodiment there may be two laterally oriented sheaves 366 configured to there around receive a portion of cable 398. A plurality of slide rollers 377 may be sandwiched between top and bottom plates 370, 372 for encouraging the connected plates 362 to slide along tracks 376, 376A. Plates 362 are depicted positioned between table top 22A rails 240A, 242A and configured to longitudinally slide therebetween along track 376, however it is understood that plates 362 slide forwardly and transition across gap 422 to continue sliding forwardly along tracks 376A.

An anchor link 374 is disposed adjacent connected plates 362, and is depicted as positioned above top plate 370. Anchor link 374 connects one end of hoisting cable 398 to first trolley assembly 354.

First actuator 358 includes a first end 378 longitudinally spaced apart from a second end 380. Actuator 358 in one particular embodiment is a hydraulic piston assembly including an outer cylindrical casing 382 receiving a moveable piston 384 and hydraulic fluid (not shown) therein. The outer casing 382 defines second end 380 coupled to the moveable slide plates 362 on first trolley assembly 354. Moveable piston 384 defines first end 378 coupled to a slide plate 386 on second trolley assembly 356. When viewed from the side and in relation to frame 350, second end 380 is positioned forwardly from first end 378.

In one embodiment, an additional third actuator 388 is spaced apart and parallel to first actuator 358 and moveable in simultaneous cooperation via hydraulics in a manner and direction similar to that of first actuator 358. Third actuator 388 is also coupled to slide plate 362 at its second end and terminates rearwardly from second end at its first end to the second slide plate 386 on second trolley assembly 356.

The first and third actuators 358, 388 connect to first trolley assembly 354 at their respective outer casings via pin 413. First and third actuators 358, 388 are inserted through a rectangular support of trolley assembly to which a mounting bracket 368 is attached.

Mounting bracket 368 on first trolley assembly 354 is configured to connect the second actuator 360. Bracket 368 is positioned beneath the bottom plate 372 adjacent the leeward end of assembly 354. In one particular embodiment, bracket 368 is mounted to the outer surface of a guide tube 402 Bracket 368 is configured to receive a connection 390 on the end of second actuator 360 to couple actuator 360 to assembly 354. However, additional conventionally understood ways of connected a piston to a stationary mount are contemplated.

With primary reference to FIG. 10C, the second trolley assembly 356 includes the second moveable slide plate 386, and a laterally oriented third sheave 392. Second trolley assembly 356 is positioned rearwardly of first trolley assembly 354 and is generally between the two rails 240, 242 and configured to slide along track 376. Second trolley assembly 356 is operatively connected to the first trolley assembly 354 via first and third actuators 358, 388.

First trolley assembly 354 is selectively moveable in a direction opposite than that of the second trolley assembly 356 when moving the container from the first to second container position. Stated otherwise, when second trolley assembly 356 moves rearwardly, the user may then selectively move the first trolley assembly 354 forwardly by actuating second actuator 360.

Figure 12:
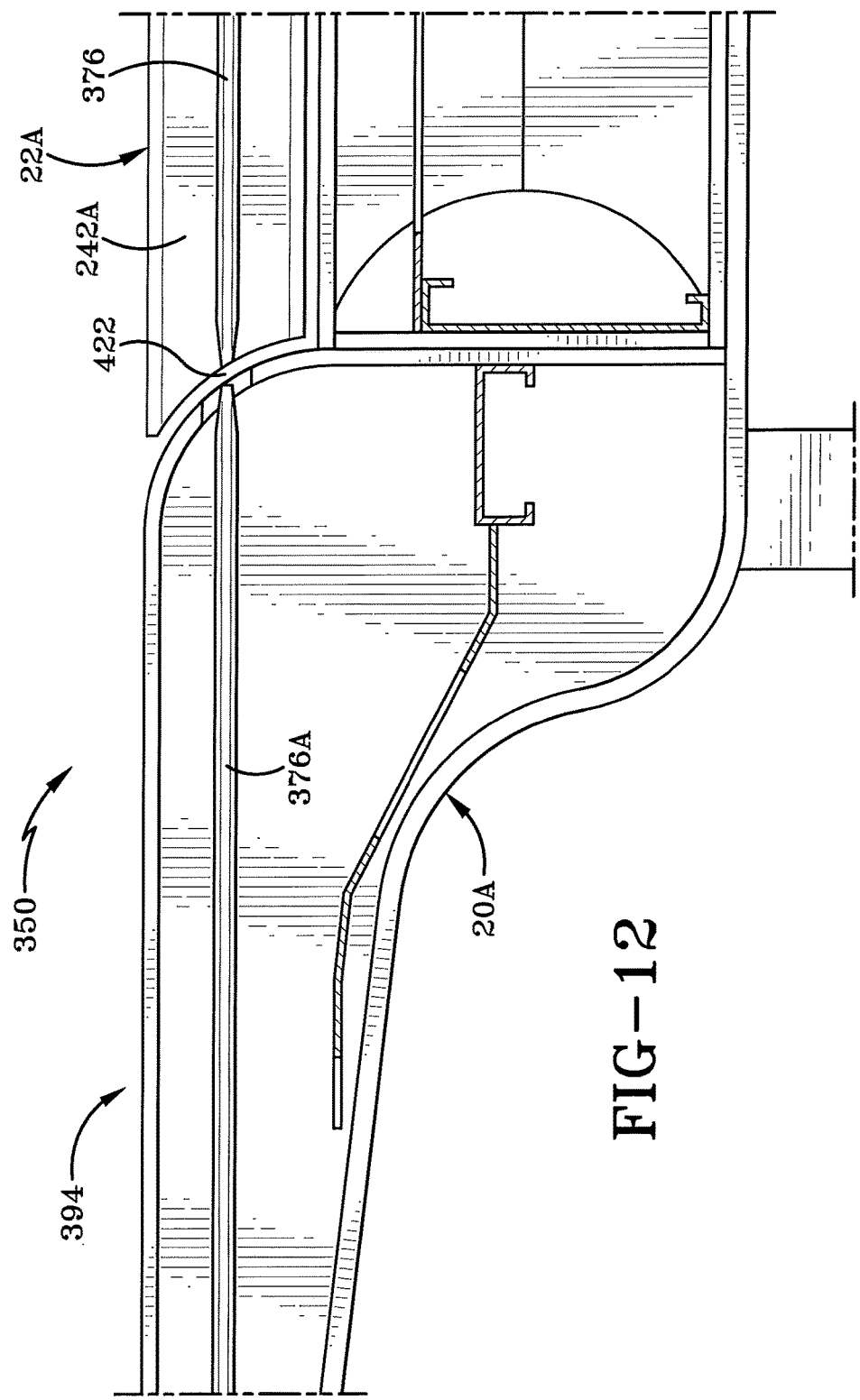
FIG. 12 is a cross-sectional view taken along line 12-12 in FIG. 10A.

As detailed in FIG. 12, the rails 240A, 242A are positioned above a portion of frame 20A on trailer 350. The track 376 may be formed along the inside portion of rails 240A, 242A for slidably receiving first and second trolley assemblies thereon. Track 376 may further continue forwardly from rails onto the front portion 394 of trailer 350 to form 376A. In the shown embodiment, trailer 350 does not have a stepped out neck as detailed in FIGS. 1-8, rather the front portion 394 is aligned with rails 240A, 242A. Clearly, a stepped out neck version of trailer 350 is possible where the rails 240A, 242A would continue forwardly between the two outer flanges of the front section 394.

Figure 13:
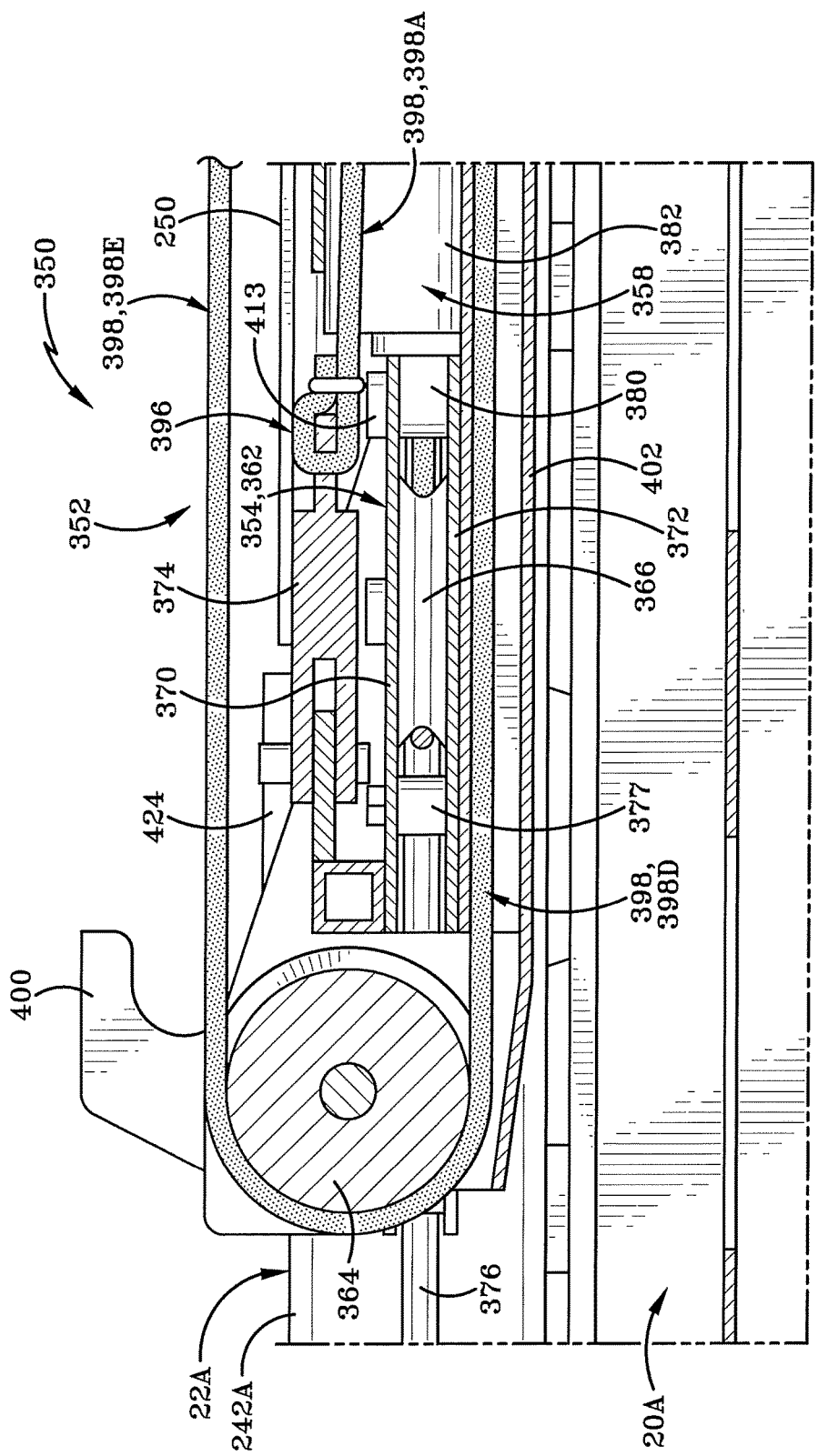
FIG. 13 is a cross-sectional view taken along 13-13 in FIG. 10B.
Figure 20:
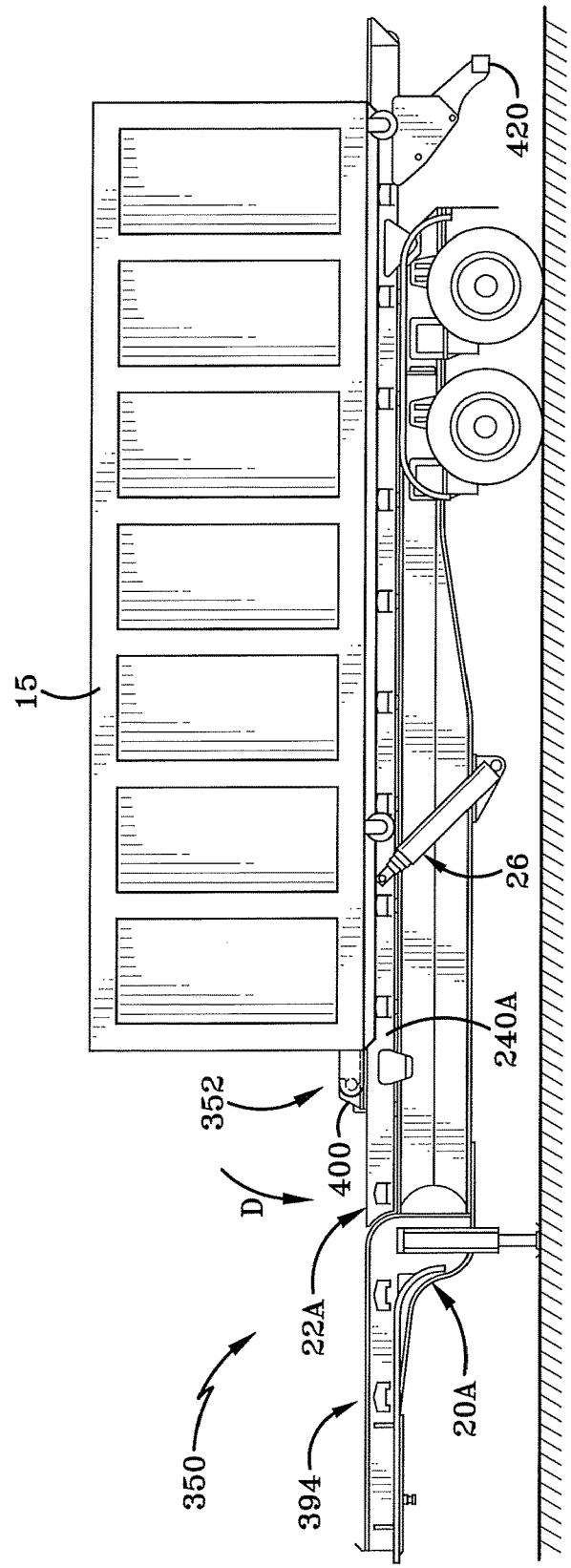
FIG. 20 is an operational side view of the second embodiment indicating the tabletop being lowered the container in a second container position.

With primary reference to FIG. 13, a partial cross section of first trolley assembly 354 is provided. First trolley assembly 354 further includes an anchor point 396 on anchor link 374 receiving an end of the hoist cable 398 for lifting the cargo container 15. Anchor point 396 is shown mounted above the laterally extending sheave 366, however clearly other positions are entirely possible. A container receiving hook 400 extends upwardly from an L-bracket 424 connected to the top plate 370 of first trolley assembly. Hook 400 is configured to mate with the container 15 when the second trolley assembly 356 moves rearwardly to draw the container onto the trailer via cable 398 to the second container position (FIG. 20).

First trolley assembly 354 further includes a guide tube 402 adjacent its lower end. Guide tube extends longitudinally from a forward end of assembly 354 to a rear end of assembly 354 beneath bottom plate 372. Guide tube 402 receives a portion of the cable 398 therethrough protecting and guiding the cable as the cable is in an operational state. In the shown embodiment, guide tube 402 has a rectangular cross section, however clearly other configurations are contemplated.

Figure 14:
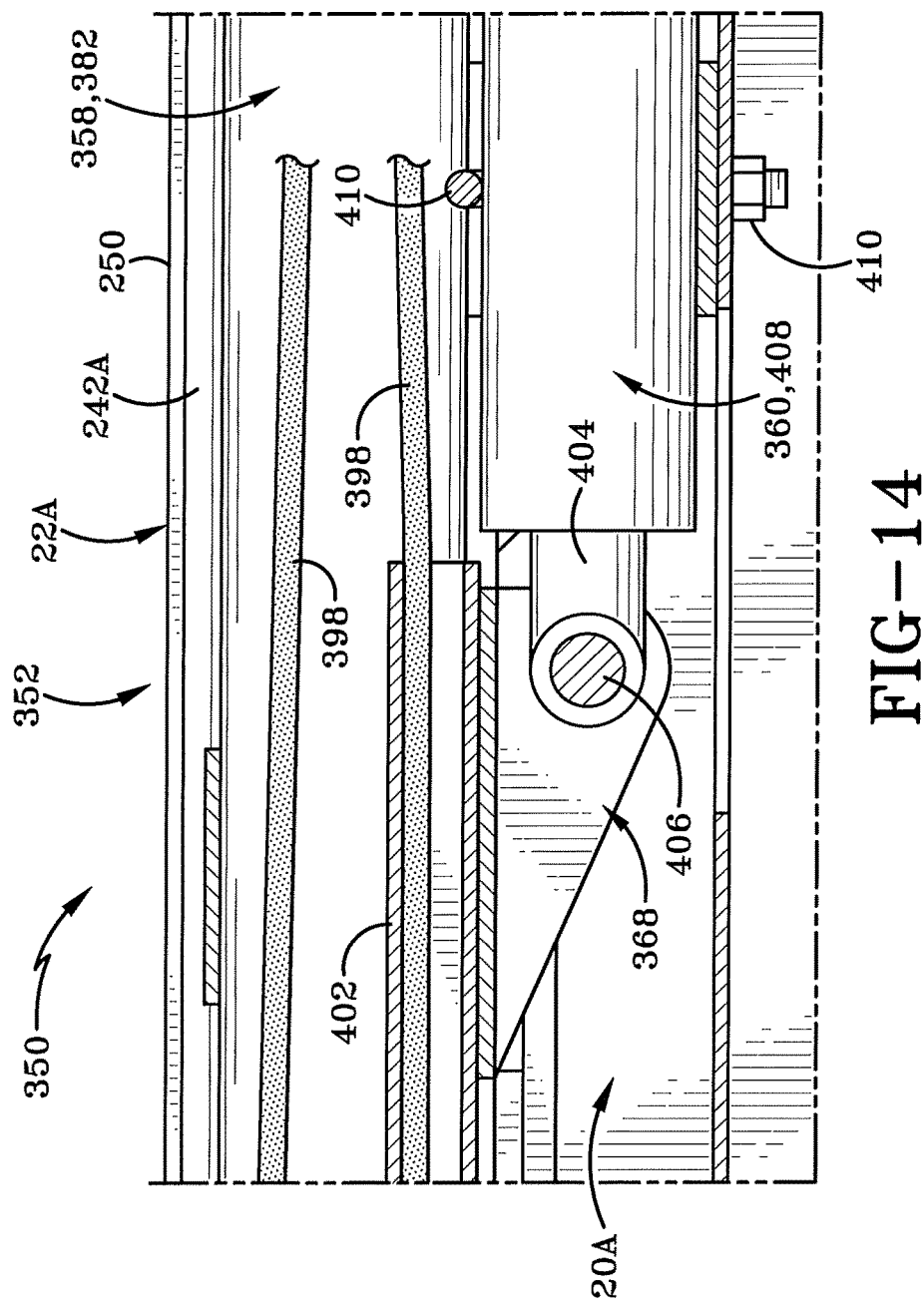
FIG. 14 is a cross sectional view taken along line 14-14 in FIG. 10B.

With primary reference to FIG. 14, first trolley assembly 354 further includes the mounting bracket 368 positioned beneath the leeward or rear end of guide tube 402. Mounting bracket 368 is configured to connect to first end of second actuator 360. In one particular embodiment, a piston 404 of second actuator 360 is connected via a pin 406. When second actuator 360 is selectively moved by the operator, first or front end of the second actuator 360 moves forwardly (to the left in FIG. 14) to push the entire first trolley assembly 354 forwardly. Additionally, the guide tube 402 is configured to terminate forwardly from second actuator casing 408, however other configurations are entirely possible.

With continued reference to FIG. 14, second actuator 360 is shown connected to trailer 20A adjacent its forward first end via a connection piece 410. The connection piece 410 depicted herein is a U-bolt, yet other manners of connecting the hydraulic housing to a frame are contemplated.

Figure 15:
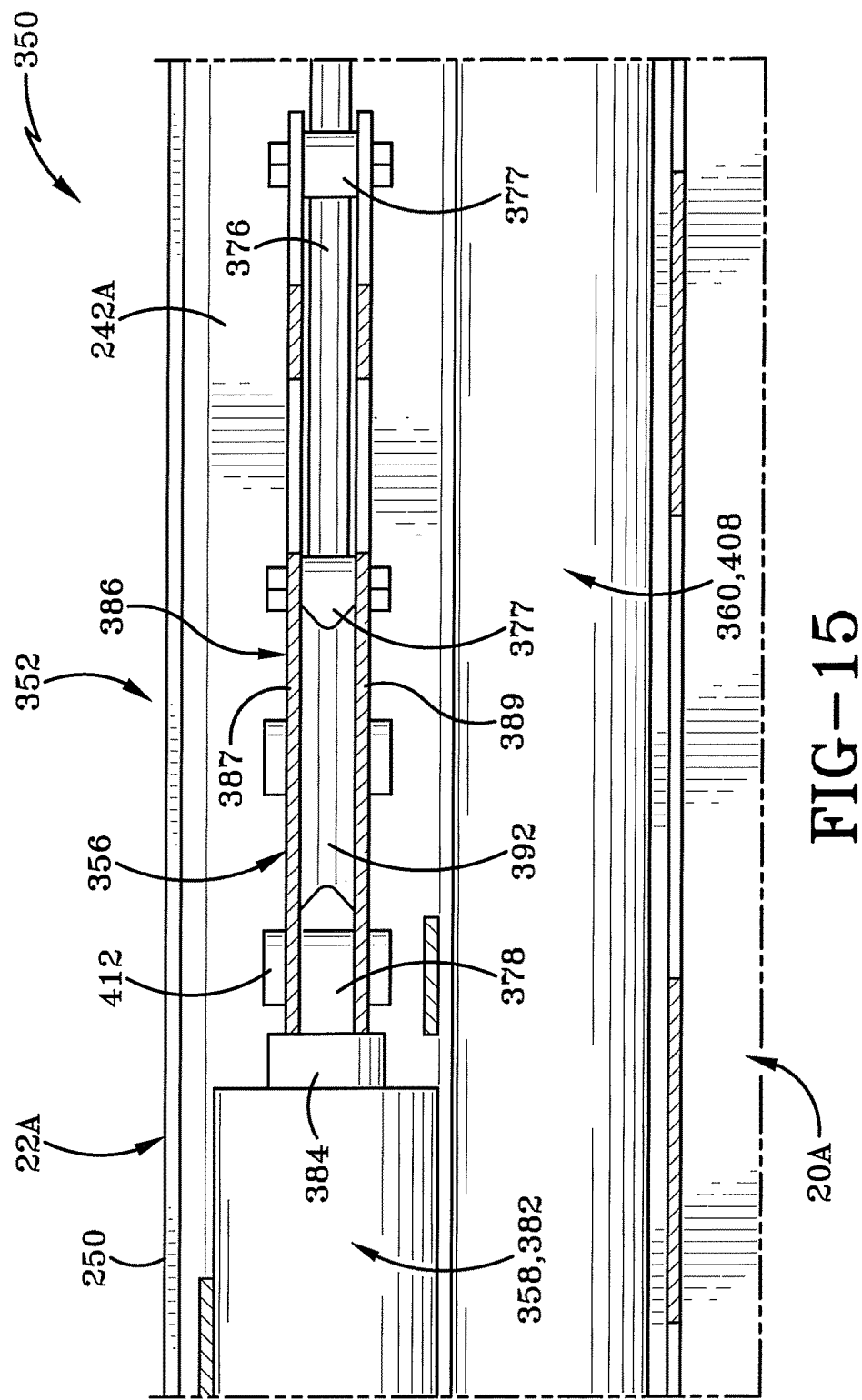
FIG. 15 is a cross-sectional view taken along line 15-15 in FIG. 10C.

As depicted in FIG. 15, the second trolley assembly 356 includes a moveable second slide plate 386 positioned rearwardly from the first trolley assembly 354. Slide plates 386 includes a top plate 387 and a bottom plate 389 spaced apart defining a sandwich space therebetween similar to that of plate 362. Components of the second trolley assembly 356 are disposed in the space between plates 387,389. A generally horizontal aligned sheave 392 is sandwiched between plates 387, 389 and configured to receive there around a portion of hoisting cable 398. Notably, FIG. 15 is depicted without hoisting cable 398 to clearly show all the components of second assembly 356. Rollers 377 may also be sandwiched between plates 387, 389 to encourage the sliding relationship of plates 387, 389 along tracks 376 by allowing the tracks 376 to slide within the space defined plates 387, 389. In the one particular embodiment second trolley assembly does not travel along forward tracks 376A, however, if desirable, adjustment to the actuator lengths could be modified to permits such a travel pathway.

Casing 382 of first actuator 358 terminates forwardly from second trolley assembly 356. The first or rear end 378 of first actuator 358 connects with the second trolley assembly 356 via a pin 412 forward from the generally horizontally aligned sheave 392. Further, second slide plate 386 receives the track 376 on each left and right side in the space between plate 387 and plate 389. Second trolley assembly 356 is configured to move rearwardly (to the right in FIG. 15) when an operator is drawing a container onto the table top 22A of the second embodiment of the present disclosure.

Figure 16:
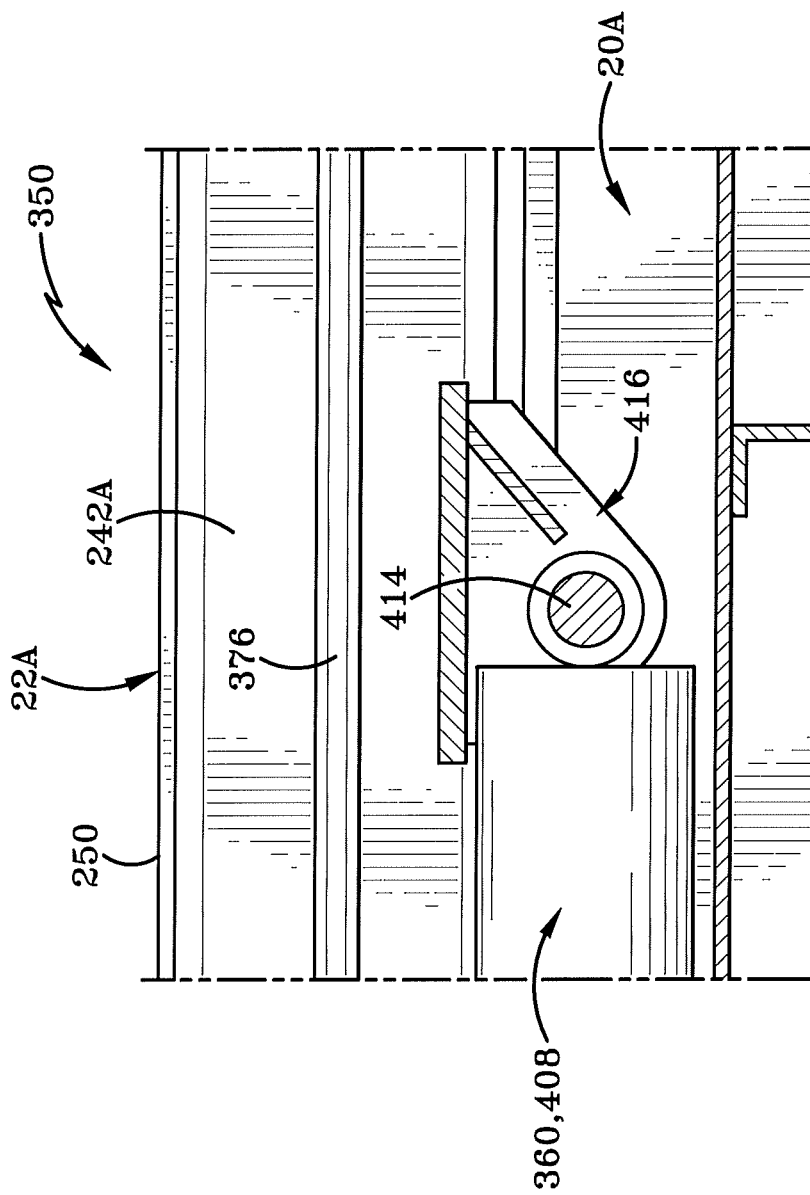
FIG. 16 is a cross-sectional view taken along line 16-16 in FIG. 10C.

With primary reference to FIG. 16, the second end (the rear end) of second actuator 360 is defined by casing 408 and connects via a pin 414 to a mounting bracket 416. Bracket 416 is fixedly attached or welded to a support arm extending between rails 240A, 242A on frame 22A of trailer 350. The connection of bracket 416 to the support arm fixedly couples said bracket 416 to frame 22A. In one exemplary non-limiting embodiment, second actuator 360 and mounting bracket 416 are laterally centered relative to frame 22A however other alignments are entirely possible. As second actuator 360 is connected to frame 22A, when the first (forward) end of second actuator 360 is selectively urged forward, the first trolley 354 moves forwardly drawing the second trolley along behind it.

Figure 17:
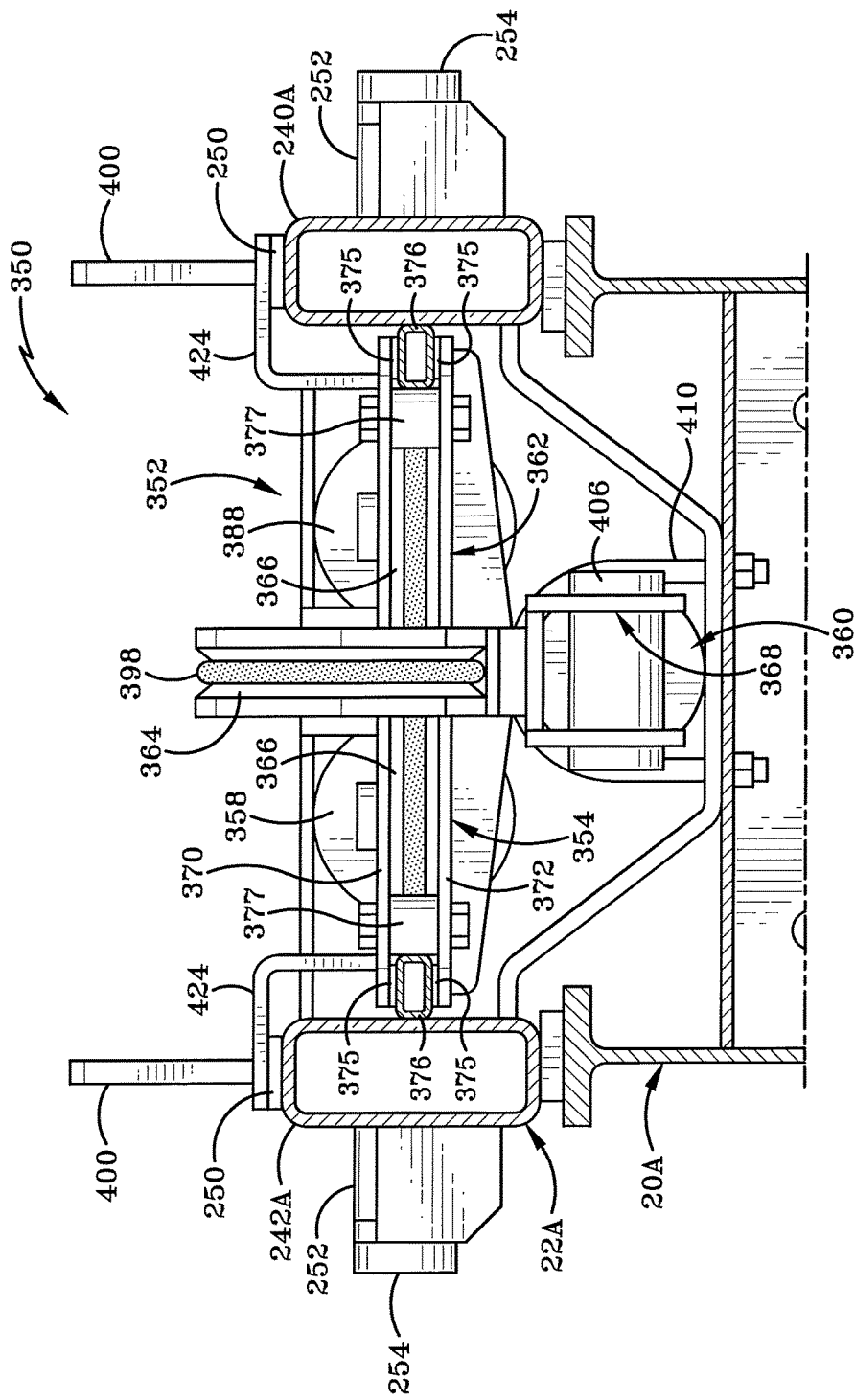
FIG. 17 is a cross-sectional view taken along line 17-17 in FIG. 10B.
Figure 18:
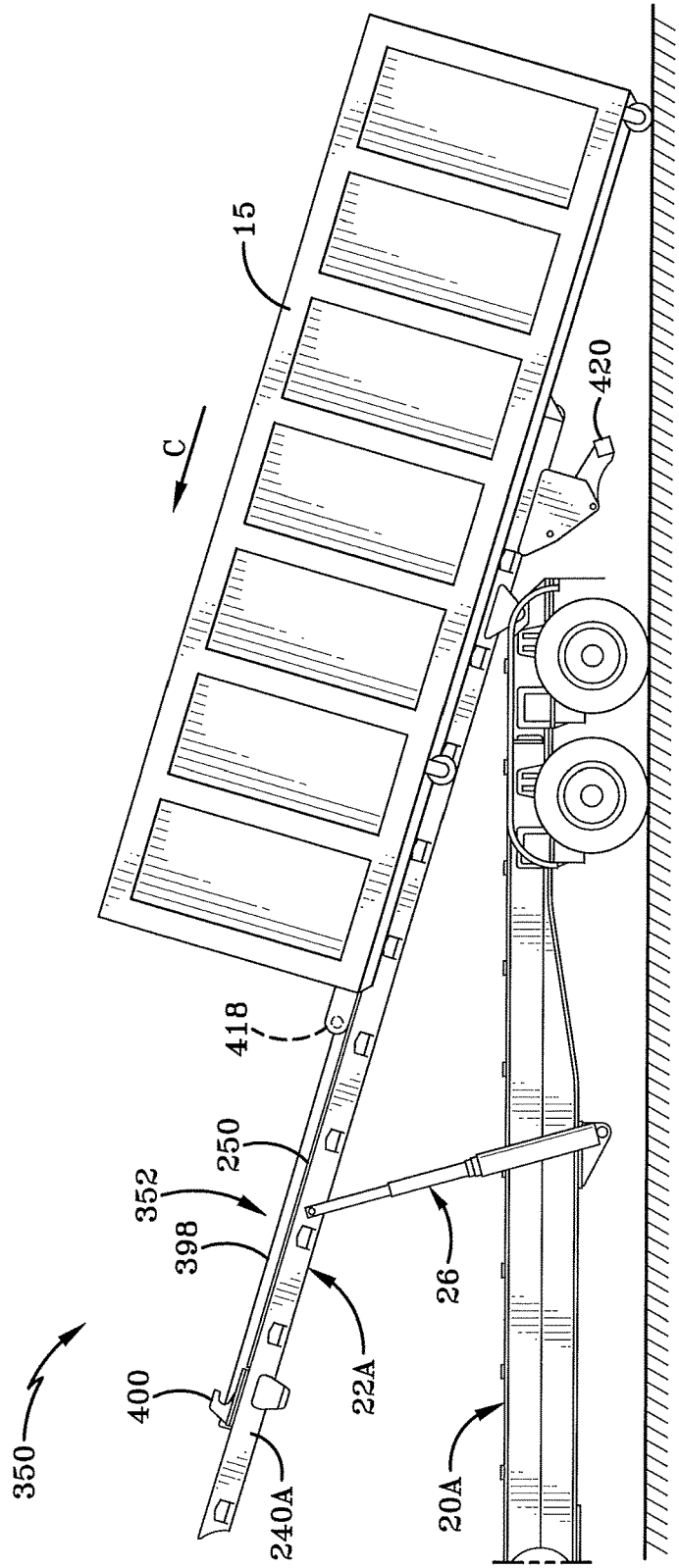
FIG. 18 is an operational view of the second embodiment depicting a tabletop drawing a container forward from a first grounded container position.

FIG. 17 shows a cross section view of the first trolley assembly 354. The first sliding plate 362 receives the track 376 on the left and right sides of plate 362 between top plate 370 and bottom plate 372 to slide longitudinally. The rails 240A, 242A are vertically aligned with the rails of the rear section of the frame 22A. Each L-bracket 424 extends upwardly from top plate 370 and contacts a top portion of a pad 250 atop each one of the rails 240A, 242A. Hooks 400 are connected respectively to L-bracket 424 and extend upwardly therefrom. The second actuator 360 is laterally centered beneath the first and third actuators 358, 388.

With respect to the cable 398 shown in second embodiment 350, a non-limiting example of wrapping or layout of cable 398 is described. One end of cable 398 is fixed to anchor link 374 (FIG. 10B and FIG. 13) and extends longitudinally rearwardly towards the second trolley assembly 356 (FIG. 10C). Cable 398 laterally extends around one sheave 392 (FIG. 10C) on second trolley 356 and then extends longitudinally forwardly toward first trolley 354. Cable 398 then extends laterally around one or both lateral sheaves 366 (FIG. 10B and FIG. 13) on first trolley 354. Cable 398 then extends longitudinally rearwardly again towards second trolley 356. Cable 398 then extends laterally around another lateral sheave (FIG. 10C) 392 on the second trolley 356. Cable 398 then extends forwardly in the longitudinal direction towards first trolley 354 and extends upwardly around vertical sheave 364 (FIG. 10B and FIG. 13). From vertical sheave 364, cable 398 extends rearwardly in the longitudinal direction and terminates at a clip 418. Clip 418 is configured to releasably connect to a receiving bracket on container 15.

In accordance with one aspect on an embodiment of the present disclosure, trailer 10 or 350 includes longitudinally rearward displacement of the second trolley assembly 356 that is configured to move the container 15 via the cable 398 from a first grounded container position to a second container position generally wherein the forward end of the container is about midway atop the rails. A longitudinal forward displacement of the first trolley assembly 354 is configured to move the container 15 via the cable 398 from the second container position to a third container position atop the rails adjacent the forward end of the trailer.

In operation and with respect to FIGS. 18-22, trailer 10 or 350 is configured to move and hoist a cargo container 15 onto the roll off trailer between three container positions: one container position on the ground and two container positions atop the table on trailer 10 or 350. An operator will raise the table top upwards into the second table position (FIG. 1A) and maneuver the trailer adjacent the container previously deposited at a site in a grounded first container position. While the lift arms 26 are raised, the rear bumper assembly 420 of the roll off trailer 10, 350 moves from a deployed position to a collapsed position, as detailed in U.S. Provisional Patent Application Ser. No. 62/045,886, entitled "ARTICULATED BUMPER FOR A ROLL OFF TRAILER", and U.S. patent application Ser. No. 14/844,112 claiming priority to this Prov. Application No. 62/045,886, which are commonly owned with the present application at the time of filing and the entirety of which is hereby by incorporated by reference as if fully rewritten. The clip 418 connects to the front end of the container 15.

Figure 19:
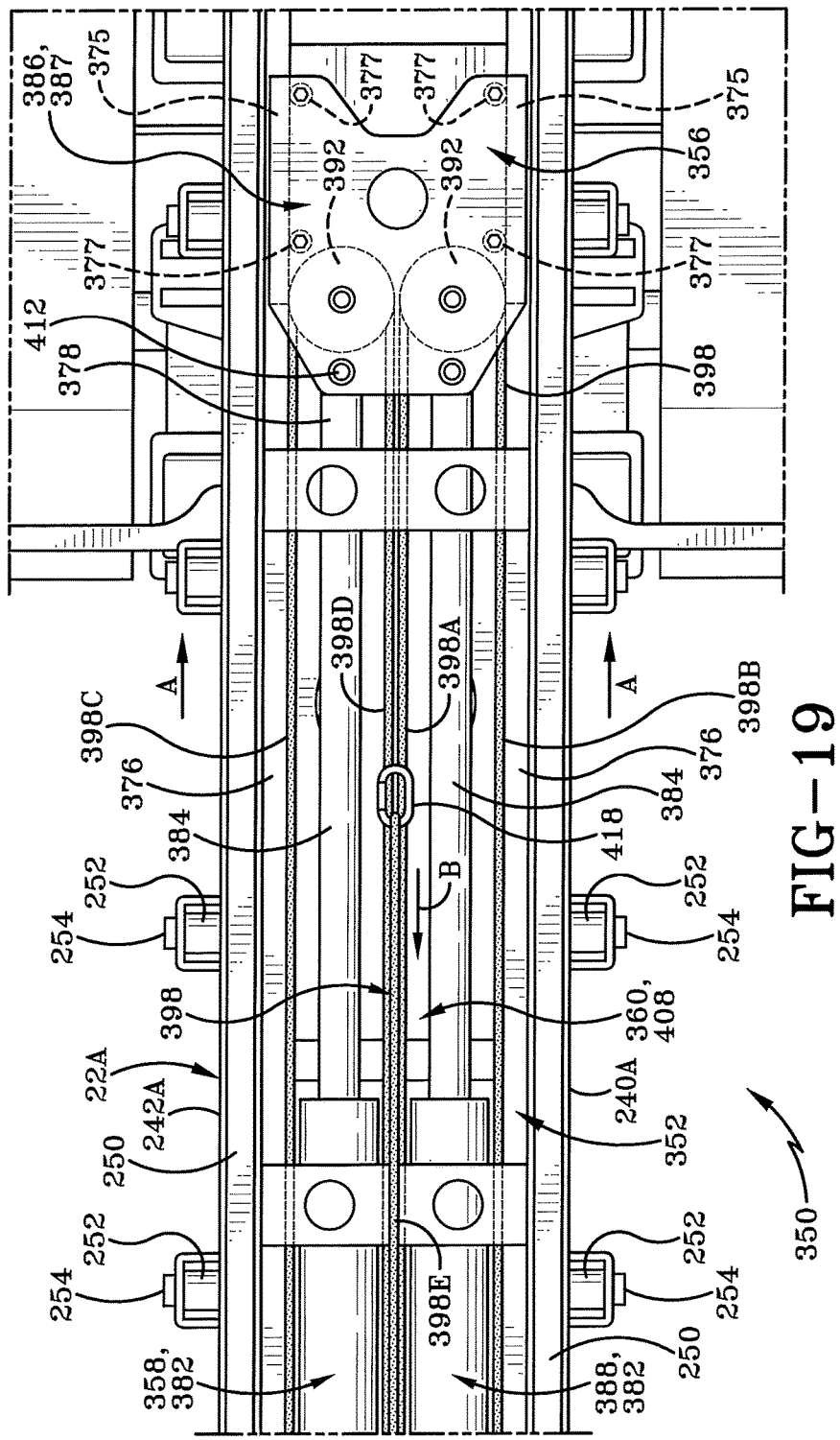
FIG. 19 is an operational top view of the second embodiment indicating a moveable trolley assembly moving rearwardly to draw a cable clip forward.

The first and third actuators 358, 388 are then urged to move their first ends 378 in the direction of Arrow A (FIG. 19). This embodiment depicts the pistons 384 on each first and third actuator 358, 388 as moving in the longitudinal direction of Arrow A. However, it is clearly understood that moving the casing rearwardly would accomplish the same feat. The movement of first end 378 in the direction of Arrow A moves the second trolley assembly 356 rearwardly. The cable 398 wrapped around the sheaves 392 is a single uniform cable wrapped around the sheaves, but for the purpose of this description will be referred to in a plurality of segments of cable. Namely, a cable first segment 398A is fixedly secured to anchor link 374 and extends rearwardly longitudinal towards one sheave 392 on second trolley assembly. First cable segment 398A wraps around the sheave on the second trolley assembly and a cable second segment 398B extends from the same sheave forwardly towards a sheave 392 on the first trolley assembly. Cable second segment 398B wraps around the sheave on the first trolley assembly and then extends axially transverse to another sheave 392 on the first trolley assembly offset to the side. From the other sheave 392 on the first trolley assembly a cable third segment 398C extends rearwardly to another sheave on the second trolley assembly. Cable third segment 398C wraps around the other sheave on the second trolley assembly and a cable fourth segment 398D extends forwardly therefrom. The cable fourth segment extends forwardly towards the first trolley assembly and wraps around the vertically oriented first sheave 364. From the vertically oriented first sheave 364 a cable fifth segment 398E extends rearwardly terminating at clip 418.

As the second trolley assembly moves in the direction of Arrow A, cable first, second, third, and fourth segments 398A, 398B, 398C, and 398D increase in length while cable fifth segment 398E decreases in length. Simultaneous to the length variations of the cable segments is the rotation of the sheaves and the drawing the clip 418 forward connected to container 15 in the direction of Arrow B, thereby moving container 15 forward with clip 418. The number of cable segments shown herein as increasing their length is four, however clearly there may be an alternative number of segments depending on how the cable is wrapped around the sheaves. The number of segments increasing in length as the second trolley moves rearwardly is proportional to the single cable fifth segment that decrease in length. Here, they four segments are proportional to the fifth segment by a factor of four as one having understanding in cable dynamics and pulleys would understand.

This action continues preferably until first and third actuators are fully extended. When the first and third actuators 358, 388 are fully extended, and the second trolley assembly 356 is adjacent the rear end of the trailer, and positioned over the rear wheels. Pistons 384 are shown as extended and exposed entirely between the tracks 376.

During the sliding motion of the second trolley assembly in the rearward direction, the slide rollers 377 roll along the tracks 376 and come to rest adjacent the rear end of the trailer. The rollers 377 may interact with the friction reducing pad 375 to lessen the coefficient of kinectic (or static) friction between the two materials respectively utilized to fabricate these elements.

The container has been moved forward and drawn up onto table 22 in the direction of Arrow C (FIG. 18), and is in a second container position (FIG. 20) located between the front and rear ends of table top 22A and the leading edge of container 15 is approximately half-way (but it could be in other locations) along the longitudinal length of trailer 350 (FIG. 20).

The lift arms 26 are lowered in the direction of Arrow D (FIG. 20) and this moves the tabletop 22A downwardly to rest atop frame 20A. In the shown embodiment, the lift arms are lowered by retracting the telescoping members that make up the lift arms to effective shorten the overall length of the lift arms. The rearward end of the lift arms pivots around a pivot connection with the frame 20A during the telescoping retraction. This pivoting downward movement in the direction of Arrow D moves the table top 22A to the first table top horizontal position above the frame.

Figure 21:
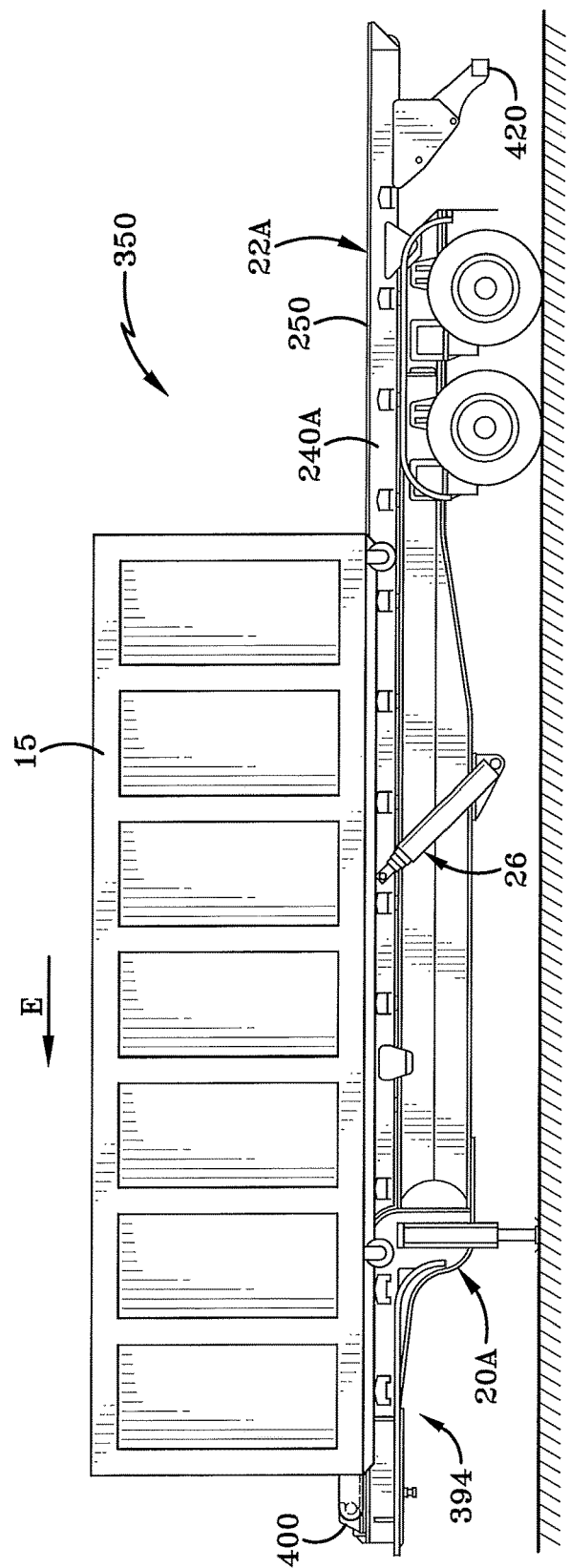
FIG. 21 is an operational side view of the second embodiment indicating that the container travels forwardly to the forward end on the trailer.
Figure 22:
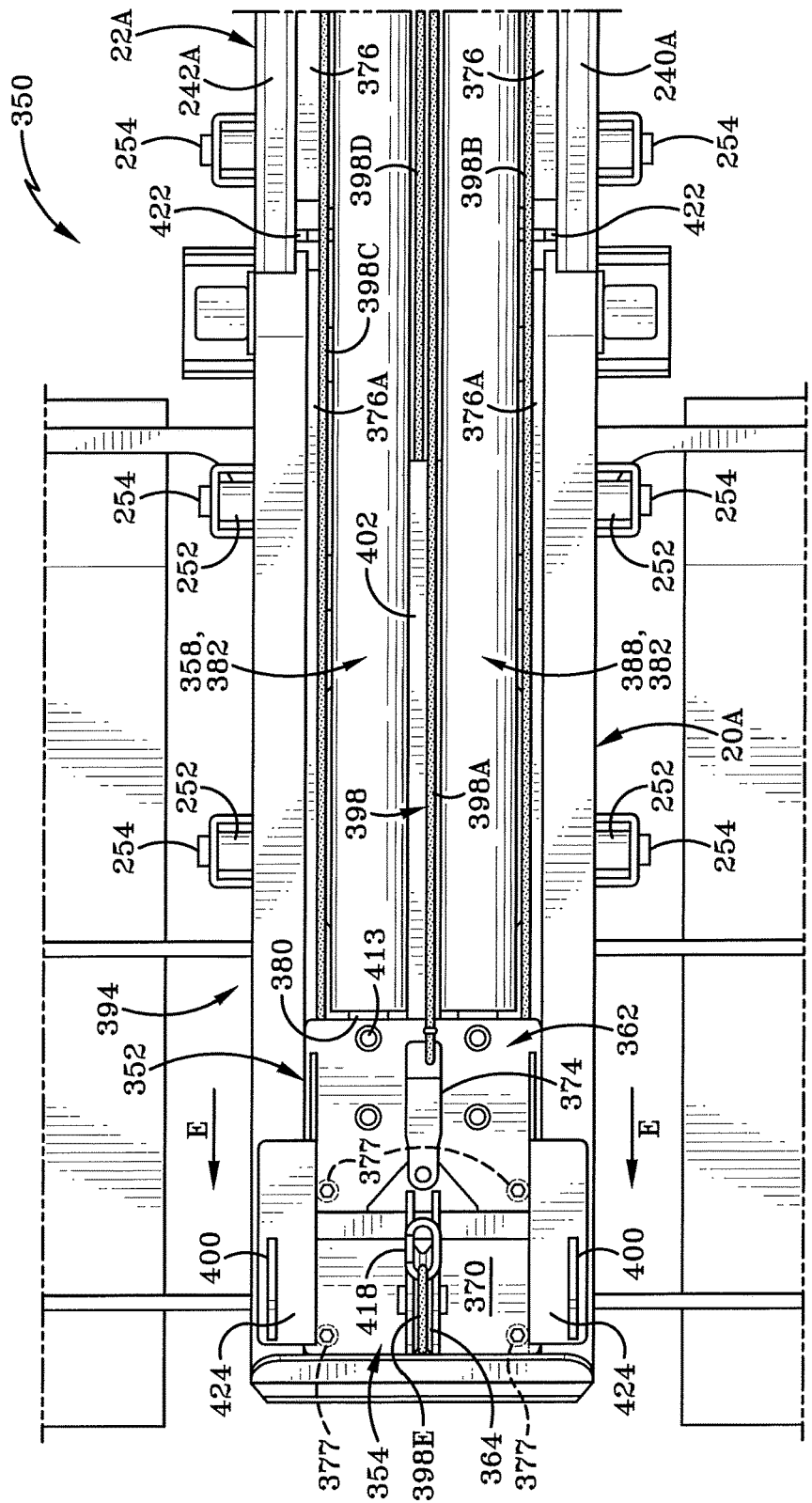
FIG. 22 is an operational top view of the second embodiment depicting a moveable trolley assembly moved forwardly to the front section of the trailer.

With primary reference to FIGS. 21-22, second actuator 360 is activated to move container from the second container position (FIG. 20) to a third container position (FIG. 21). More particularly, second actuator 360 (FIG. 14; FIG. 16) moves piston 404 (FIG. 11B) defining its forward end and fixedly connected to the first trolley assembly, forwardly towards the front of the trailer in the direction of Arrow E to the position seen in FIG. 22.

The forward movement of piston 404 causes the first trolley assembly 354 to move forward in the direction of Arrow E, the connection of first and third actuators 358, 388 between first and second trolley assemblies 354, 356 draws the second trolley 356 forward along tracks on the rails.

The first trolley assembly traverses the gap 422 between table top 22A and the front portion of the frame. As the first trolley traverses the gap and transitions to riding along the rails on the forward end of the frame, the clip 418 moves closely adjacent the first trolley assembly to a position forward from the gap 422.

When container is in the third position, and as shown in this non-limiting embodiment, the first end of the second actuator 360 terminates adjacent the neck section of the trailer where forward first trailer section meets rear second section of trailer.

When the container 15 is in the third container position, the forward end of container 15 is located adjacent the forward end of the trailer 350 above the forward front first section of the trailer.

The terminal end of the cable, where clip 418 is located, moves between three positions during the lifting action of the trailer. Particularly, a first extended cable position is when the cable fifth segment 398E is at its longest. This extended cable position is used to connect the clip to the container. Then as the second trolley assembly moves longitudinally rearward relative to the frame, the extension of the cable first through fourth segments 398A-398D increases which affects the decreasing length of cable fifth segment. When the second trolley has been pushed rearward along the tracks, the terminal end of the cable fifth segment is located at a cable second segment approximately longitudinally midway relative to the frame, such that the leading edge of the container is in approximately the same longitudinal position. Then, terminal edge of the cable fifth segment 398E moves to a third cable position proximate the forward end of the trailer frame as the first trolley assembly moves longitudinally forward between the rails and relative to the frame. The second cable position is longitudinally between the first and third cable positions. When the cable is in the first cable position, the cable fifth segment 398E is at its longest, and when the cable is in the third cable position, the cable fifth segment 398E is at its shortest.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A roll off trailer comprising:
    a frame having a forward end and a rear end that define a longitudinal direction therebetween, and having a first side and a second side that define a lateral direction therebetween, and having a top and a bottom that define a vertical direction therebetween;
    a first moveable trolley assembly longitudinally moveable relative to the frame, and the first moveable trolley assembly includes a lateral first sheave and an anchor point positioned vertically above the lateral first sheave;
    a second moveable trolley assembly longitudinally moveable relative to the frame;
    a cable fixedly secured to the anchor point on the first moveable trolley assembly and positioned vertically above the lateral first sheave on the first moveable trolley assembly and extending around additional sheaves on the first and second moveable trolley assemblies and terminating at a free end, the free end adapted to connect to a container and move the container as the first and second moveable trolley assemblies and the anchor point move relative to the frame;
    a first position, a second position, and a third position associated with the free end of the cable, wherein the first position is adjacent the rear end of the frame, the second position is intermediate the forward end and the rear end of the frame, and the third position is adjacent the forward end of the frame;

wherein the free end moves from the first position to the second position in response to the second moveable trolley assembly moving longitudinally rearward, and thereafter the free end moves from the second position to the third position in response to the first moveable trolley assembly moving longitudinally forward;

a pair of longitudinally extending rails pivotably coupled with the frame, the rails adapted to support a container thereon, wherein the first and second moveable trolley assemblies are moveable between the rails;

a first actuator to displace the second moveable trolley assembly rearward, wherein a rearward displacement of the first actuator moves the free end of the cable from the first position to the second position;

a second actuator to displace the first moveable trolley assembly forward, wherein a forward displacement of the second actuator moves the free end of the cable from the second position to the third position atop the rails adjacent the forward end on the frame; and a protective guide tube on the first moveable trolley assembly positioned below the anchor point, and the protective guide tube extending longitudinally rearward further than the anchor point and terminating forwardly from a casing of the second actuator, wherein the cable is strung through the protective guide tube and extends rearwardly towards the second moveable trolley assembly.

2. The trailer of claim 1, wherein the first actuator extends between and is coupled to the first and second moveable trolley assemblies.

3. The trailer of claim 2, wherein the first actuator includes a hydraulic piston and cylinder defining the first actuator.

4. The trailer of claim 3, wherein the cylinder is coupled to the first moveable trolley assembly, and the piston is coupled to the second moveable trolley assembly.

5. The trailer of claim 2, wherein the second actuator extends between and is coupled to the first moveable trolley assembly and the frame.

6. The trailer of claim 5, wherein the second actuator includes a hydraulic piston coupled to the first moveable trolley assembly and a cylinder coupled to the rails.

7. The trailer of claim 1, further comprising:
a third actuator adjacent and operating simultaneously with the first actuator, the third actuator extending between and coupled to the first and second moveable trolley assemblies.

8. The trailer of claim 7, further comprising:
a cylinder on the third actuator spaced apart and parallel with a cylinder on the first actuator.

9. The trailer of claim 1, wherein the second actuator is positioned vertically beneath the first actuator.

10. The trailer of claim 1, further comprising:
a track having forward and rear portions operatively engaged by the first and second moveable trolley assemblies.

11. The trailer of claim 10, further comprising:
a table top defined by two rails pivotably connected to the frame;
wherein the forward portion of the track is on a forward section of the frame longitudinally aligned with the rear portion of the track on the table top;
a gap formed between the forward portion of the track and the rear portion of the track; and
wherein the first moveable trolley assembly is configured to traverse the gap by moving longitudinally along the track from the rear portion of the track forwardly towards the forward portion of the track.

12. The trailer of claim 11, further comprising:
a first moveable slide plate on the first moveable trolley assembly operatively engaging the track and positioned vertically below the anchor point;
a second moveable slide plate on the second moveable trolley assembly operatively engaging the track rearwardly from the first moveable slide plate;
a displacement direction of the second slide plate rearwardly and away from the first slide plate associated with drawing the free end of the cable forwardly above the frame from the first position to the second position and between rails on the table top.

13. The trailer of claim 1, further comprising:
an anchor link on the first moveable trolley assembly, wherein the anchor point defines a rear end of the anchor link.

14. The trailer of claim 13, further comprising:
a lateral second sheave on the second moveable trolley assembly;
a lateral third sheave on the first moveable trolley assembly;
the cable extending around each of the first and second sheaves; and
a mounting bracket positioned beneath the protective guide tube connected to the second actuator via a pin, wherein the second actuator moves forwardly to push the first trolley assembly forward.

15. The trailer of claim 1, further comprising:
a table top having a pair of longitudinally extending rails pivotably coupled with the frame, the rails adapted to support a container thereon, wherein the first and second moveable trolley assemblies are moveable between the rails;
a first actuator extending between and coupled to the first moveable trolley assembly and the second moveable trolley assembly; and
a second actuator adjacent the first actuator, the second actuator extending between and coupled to the first moveable trolley assembly and the second moveable trolley assembly.

16. The trailer of claim 1, further comprising:
a table top having a pair of longitudinally extending rails pivotably coupled with the frame, the rails adapted to support a container thereon, wherein the first and second moveable trolley assemblies are moveable between the rails;
a first actuator including two ends, one end coupled to the first moveable trolley assembly and one end coupled to the second moveable trolley assembly;
a second actuator including two ends, one end coupled to the first moveable trolley assembly and one end coupled to the rails; and
a third actuator spaced apart and parallel to the first actuator, the third actuator including two ends, one end coupled to the first moveable trolley assembly and one end coupled to the second moveable trolley assembly.

17. The trailer of claim 16, further comprising:
wherein the second actuator is positioned directly below the first and third actuators.

18. The trailer of claim 1, in combination with a moveable container disposed in a first position separate from the trailer, the combination comprising:

a table top having a pair of longitudinally extending rails pivotably coupled with the frame, the rails supporting the container when the container is pulled thereon, wherein the first and second moveable trolley assemblies are moveable between the rails;

wherein the free end of the cable is coupled to the container and a second end of the cable is fixedly secured to the first moveable trolley assembly;

a first actuator including a first end coupled to the first moveable trolley assembly and a second end coupled to the second moveable trolley assembly;

a container second position, the second position located on the rails between a forward and a rear end on the trailer;

the first actuator configured to move the container from the first position to the second position;

a container third position, the third position located on the rails forward from the second position; and a second actuator including a first end coupled to the first moveable trolley assembly and a second end coupled to the rails, the second actuator moving the container from the second position to the third position.

19. The trailer of claim 1, further comprising:

a track comprising a forward portion on the trailer frame front section and a rear portion on a container carrying table top including two rails aligned with the forward portion supported by the trailer frame rear section;

a gap in the track between the forward and rear portions; and a first slide plate on the first moveable trolley assembly defining a channel, the channel receiving the track therethrough to permit the first slide plate to move from a first position across the gap to a second position forwardly of the gap in the front section on the frame.

* * * * *